(12) United States Patent
Nishimura et al.

(10) Patent No.: US 12,487,171 B2
(45) Date of Patent: Dec. 2, 2025

(54) ANALYSIS DEVICE AND ANALYSIS METHOD

(71) Applicant: ALFRESA PHARMA CORPORATION, Osaka (JP)

(72) Inventors: Kazuya Nishimura, Osaka (JP); Yosuke Doi, Osaka (JP); Yuko Fukumoto, Osaka (JP); Shiqin Wu, Osaka (JP)

(73) Assignee: Alfresa Pharma Corporation, Osaka (JP)

( * ) Notice: Subject to any disclaimer, the term of this patent is extended or adjusted under 35 U.S.C. 154(b) by 991 days.

(21) Appl. No.: 16/645,620

(22) PCT Filed: Mar. 2, 2018

(86) PCT No.: PCT/JP2018/008048
§ 371 (c)(1),
(2) Date: Mar. 9, 2020

(87) PCT Pub. No.: WO2019/049395
PCT Pub. Date: Mar. 14, 2019

(65) Prior Publication Data
US 2023/0152215 A1    May 18, 2023

(30) Foreign Application Priority Data
Sep. 8, 2017   (JP) .................. 2017-173405

(51) Int. Cl.
  *G01N 21/31*   (2006.01)
  *G01N 21/82*   (2006.01)
  *G01N 33/543*  (2006.01)

(52) U.S. Cl.
CPC .......... *G01N 21/31* (2013.01); *G01N 33/543* (2013.01); *G01N 2021/825* (2013.01); *G01N 2201/127* (2013.01)

(58) Field of Classification Search
CPC ................ G01N 21/31; G01N 33/543; G01N 2021/825; G01N 2201/127;
(Continued)

(56) References Cited

U.S. PATENT DOCUMENTS 4,157,871 A * 6/1979 Anderson .............. G01N 21/47
                                                           436/805
5,019,999 A * 5/1991 Swirski, Jr. .......... G01N 33/539
                                                           436/805
(Continued)

FOREIGN PATENT DOCUMENTS

CN       101055272 A   10/2007
EP          1460414 A1  9/2004
(Continued)

OTHER PUBLICATIONS

Translation of JP H06109740 A, Nakano Kiyokazu, Apr. 22, 1994 (Year: 1994).*
(Continued)

*Primary Examiner* — Henry H Nguyen
(74) *Attorney, Agent, or Firm* — Knobbe, Martens, Olson & Bear, LLP

(57) ABSTRACT

Provided are an analysis device, an analysis method, and the like that predict a concentration even for a sample having high concentration that can be outside a measurement range as it is, using an absorbance measurement result in a reaction course at the time of measurement of a test liquid containing an immunological reagent and the sample, and determine an optimum dilution rate to conduct measurement. As the present invention, for example, an analysis device having means (A) that detects a prozone during measurement of a sample, and means (B) that determines a high concentration region by automatically determining a dilution rate of the test liquid can be recited.

9 Claims, 9 Drawing Sheets

(58) Field of Classification Search
CPC ............. G01N 33/5304; G01N 21/272; G01N 21/3577; G01N 21/59
See application file for complete search history.

(56) References Cited

U.S. PATENT DOCUMENTS

| | | | | |
|---|---|---|---|---|
| 2004/0096985 A1* | 5/2004 | Kenjyou | ............. | G01N 33/558 436/514 |
| 2007/0243559 A1 | 10/2007 | Gunzer et al. | | |
| 2010/0167310 A1 | 7/2010 | Yamamoto et al. | | |
| 2012/0309636 A1* | 12/2012 | Gibbons | ............. | C12Q 1/42 435/6.12 |
| 2016/0161480 A1* | 6/2016 | Hegel | ............. | G01N 33/557 435/7.1 |

FOREIGN PATENT DOCUMENTS

| | | | | |
|---|---|---|---|---|
| EP | 1845373 | | 10/2007 | |
| EP | 2837937 A1 | | 2/2015 | |
| GB | 1845373 A1 * | | 10/2007 | ............. G01N 33/50 |
| JP | S57-163848 A | | 10/1982 | |
| JP | H05-093725 | | 4/1993 | |
| JP | H06-109740 A | | 4/1994 | |
| JP | H08-292192 A | | 11/1996 | |
| JP | H10-282099 A | | 10/1998 | |
| JP | 2909140 B2 * | | 6/1999 | |
| JP | 2000-275246 A | | 10/2000 | |
| JP | 3851807 B | | 11/2006 | |
| JP | 2007-286053 A | | 11/2007 | |
| JP | 2009-085702 A | | 4/2009 | |
| JP | 4413179 B | | 2/2010 | |
| JP | 2012-193959 A | | 10/2012 | |
| WO | WO 2003/056312 A | | 7/2003 | |
| WO | WO 2007/074860 A1 | | 7/2007 | |
| WO | WO 2010/004416 | | 1/2010 | |

OTHER PUBLICATIONS

Translation of JP-2909140-B2, Matsuzaki Shunji, Jun. 23, 1999 (Year: 1999).*
Communication pursuant to Article 94(3) EPC issued in EP Application No. 18854378.9, dated Aug. 23, 2022.
Office Action issued in Eurasian Application No. 202090630, dated Jul. 27, 2022.
Extended European Search Report issued in EP Application No. 18854378.9, dated Jul. 23, 2021.
Notice of Reasons for Refusal issued in Japanese Application No. 2019-540749, dated Jul. 28, 2021.
Office Action issued in Thai Application No. 2001001310, dated Apr. 18, 2023.
International Search Report issued in application No. PCT/JP2018/008048, dated May 15, 2018.
Decision of Refusal issued in Japanese Application No. 2019-540749, dated Mar. 4, 2022.
Notice of Reasons for Refusal issued in Japanese Application No. 2022-093468, dated Jul. 4, 2023.
Office Action issued in Vietnamese Application No. 1-2020-01524, dated Jun. 28, 2023.
Office Action issued in Canadian Application No. 3,075,248, dated Sep. 1, 2021.
Notice of Reasons for Refusal issued in Japanese Application No. 2019-540749, dated Jan. 25, 2023.
Office Action issued in Eurasian Application No. 202090630, dated Jan. 27, 2023.
Office Action issued in Chinese Application No. 201880058304.X, dated Jan. 28, 2023.
Office Action issued in Korean Application No. 10-2020-7009931, dated Feb. 21, 2023.
Office Action issued in Korean Application No. 10-2020-7009931, dated Jun. 3, 2022.
Office Action issued in EA Application No. 202090630, dated Nov. 29. 2021.
Office Action issued in JP Application No. 2019-540749, dated Dec. 6, 2021.
Interntional Preliminary Report on Patentability issued in application No. PCT/JP2018/008048, dated Mar. 19, 2020.
Office Action issued in Chinese Application No. 201880058304.X, dated Aug. 19, 2023.
Office Action issued in EP Application No. 18854378.9, dated Sep. 21, 2023.
Office Action issued in Mexican Application No. MX/a/2020/002450, dated Jul. 2, 2024.
Office Action issued in Australian Application No. 2018330943, dated Jul. 19, 2024.
Office Action issued in Australian Application No. 2018330943, dated Nov. 29, 2024.
Office Action issued in Mexican Application No. MX/a/2020/002450, dated Nov. 19, 2024.
Office Action dated Jul. 14, 2025 in corresponding Australian Application No. 2018330943, in 11 pages.
Office Action dated May 9, 2025 in corresponding Australian Application No. 2018330943, in 8 pages.

* cited by examiner

ANALYSIS DEVICE AND ANALYSIS METHOD

TECHNICAL FIELD

The present invention relates to an analysis device and an analysis method, a dilution device and a dilution method for a test liquid containing an agglutination-based immunological reagent and a component to be analyzed, and an immunological reagent for use in these devices and methods.

BACKGROUND ART

Recently, automation and reduction in measuring time are attempted in various examinations such as clinical examinations. As an examination method, measurement methods utilizing immunological reaction for measuring a substance in a biological sample are widely used. Many immunological measurement methods including radioimmunoassay (RIA), enzyme immunoassay (EIA), immunonephelometry, latex agglutination, colloidal gold agglutination, and immunochromatography are known. Among these, immunological agglutination such as latex agglutination or colloidal gold agglutination, which does not require separation of the reaction liquid and a washing operation, is suited for automation of measurement, and short-time measurement.

However, when concentrations of a component to be measured contained in the sample lie in a wide range, there arises a problem that the objective component cannot be measured accurately and efficiently due to the influence of a prozone phenomenon. The prozone phenomenon is the phenomenon that the reaction is suppressed due to high concentration of the objective component in an actual sample, and the objective component is determined to be apparently absent, or present in a low concentration.

As a solution for the prozone, for example, a method of suppressing the phenomenon by adding a surfactant or the like rather than conducting dilution (Patent Document 1), and a method of measuring while devising an antibody for a specific objective component having a high concentration range such as serum amyloid A or C-reactive protein (Patent Documents 2 and 3) have been devised, however, with such methods, the phenomenon cannot be sufficiently suppressed, or such device cannot be utilized depending on the objective component.

Further, when a diluting operation is included, the measurement range of the objective component is generally about 10 to 50 times the reference level. For such a sample having high concentration outside the measurement range, operations that are complicated and require accuracy, such as dilution before measurement, uniform dilution before and after measurement, and dilution repeated several times to make the sample measurable have been conducted. However, for example, the needs for quantitative measurement of a component having a very wide concentration range such as fecal calprotectin or fecal hemoglobin, or fecal lactoferin and so on having a concentration distribution of about 10000 times are high in clinical environments. For rapid and accurate measurement of an objective component contained in a sample that is highly possibly influenced by the prozone phenomenon, it is desired that the sample is diluted at an optimum rate.

PRIOR ART DOCUMENTS

Patent Documents

Patent Document 1: JP-B2-3851807
Patent Document 2: JP-B2-4413179
Patent Document 3: JP-A-2009-85702

SUMMARY OF THE INVENTION

Problems to be Solved by the Invention

As described above, conventionally, in a measurement or the like with an agglutination-based immunological reagent, for example, in measurement of items such as fecal hemoglobin, fecal calprotectin, and fecal lactoferin and the like, for which an object to be measured has a wide range, the fact that the sample has a concentration outside a measurement range is realized after a series of measurements for a sample having high concentration outside the measurement range, and thus it has been necessary to dilute the sample again, and measure again, and repeat the dilution and measurement operations until the sample falls within an appropriate concentration region. In a measuring method or the like utilizing an agglutination-based immunological reaction, there is a problem that the prozone phenomenon occurs when the concentration of the component to be analyzed is high, and thus it has been difficult to analyze the concentration and the behavior rapidly and accurately.

In light of the above, it is an object of the present invention to provide an analysis device and an analysis method that predict a concentration even for a high concentration sample that can be outside the measurement range as it is, using an absorbance measurement result (alternatively called an absorbance variation or the like, and means absorbance variation, absorbance, difference in absorbance, rate of change in absorbance, and so on) in a reaction course at the time of measurement of a test liquid containing an immunological reagent and the sample, and determine an optimum dilution rate to conduct measurement.

Also, it is an object of the present invention to provide an analysis device and an analysis method, and an immunological reagent for use in the analysis device and the analysis method, that predict a concentration even for a sample having high concentration that can be outside a measurement range as it is, using an absorbance measurement result in a reaction course at the time of measurement of a test liquid containing an immunological reagent and the sample, and determine an optimum dilution rate to conduct measurement accompanied by the dilution (dilution reexamination).

Further, it is an object of the present invention to provide an analysis device and an analysis method that output a concentration without accompanied by dilution reexamination even for a sample having high concentration that can be outside a measurement range as it is, using an absorbance measurement result in a reaction course at the time of measurement of a test liquid containing an immunological reagent and the sample.

Also, it is an object of the present invention to provide a dilution device and a dilution method that predict a concentration even for a sample having high concentration that can be outside a measurement range as it is, using an absorbance measurement result in a reaction course at the time of measurement of a test liquid containing an immunological reagent and the sample, and determine an optimum dilution rate to conduct the dilution.

Also, it is an object of the present invention to provide an immunological reagent that is suitably used in the analysis device and the analysis method, and the dilution device and the dilution method.

Means for Solving the Problems

The present inventors made diligent efforts to solve the aforementioned problems, and devised an analysis device and an analysis method, and an immunological reagent for use in the analysis device and the analysis method, and found that the aforementioned objects can be achieved by the aforementioned device and the like, to finally accomplish the present invention.

An analysis device of the present invention is an analysis device for a test liquid containing an agglutination-based immunological reagent and a component to be analyzed, the device including:

means (A) that detects a prozone during measurement of the component to be analyzed; and means (B) that determines a high concentration region by automatically determining a dilution rate of the test liquid.

Also, in the analysis device of the present invention, the means (A) that detects a prozone may be detection means using an absorbance measurement result in a reaction course of the component to be analyzed.

Also, in the analysis device of the present invention, the detection means may be detection means that detects a prozone by referring to change in absorbance in a reaction course of a calibration sample for the component to be analyzed that is measured in advance.

Also, in the analysis device of the present invention, the means (B) that determines a high concentration region may be determination means that determines a dilution rate of the test liquid by using an absorbance measurement result in a reaction course of the component to be analyzed.

Also, in the analysis device of the present invention, the determination means may be determination means that determines a dilution rate of the test liquid by referring to change in absorbance in a reaction course of a calibration sample for the component to be analyzed that is measured in advance.

Also, in the analysis device of the present invention, the analysis device can further include means (C) that dilutes the test liquid at the dilution rate determined by the means (B) that determines a high concentration region.

In the analysis device of the present invention, the component to be analyzed may include a tissue-derived component.

Also, an analysis device of the present invention is an analysis device for a test liquid containing an agglutination-based immunological reagent and a component to be analyzed, the device including:

means (A) that detects a prozone during measurement of the component to be analyzed; and means (D) that outputs a concentration of the component to be analyzed based on an absorbance measurement result in a reaction course of the component to be analyzed without accompanied by dilution reexamination.

The analysis device of the present invention may include the means (D) that outputs a concentration of the component to be analyzed using an initial time at which a threshold is exceeded in place of the absorbance measurement result in the reaction course.

Also, the analysis device of the present invention may include the means (D) that conducts nonlinear fitting for absorbance measurement result (y) and reaction time (x) in the reaction course, extracts a parameter, and outputs a concentration of the component to be analyzed.

Also, the analysis device of the present invention may include the means (D) that outputs a concentration of the component to be analyzed, wherein the nonlinear fitting uses a cumulative distribution function, or a function obtained by adding one or both of a constant of proportionality and a constant term to a cumulative distribution function.

Also, the analysis device of the present invention may include the means (D) that outputs a concentration of the component to be analyzed using a mode of a probability density function obtained by differentiating the cumulative distribution function as a parameter.

Also, the analysis device of the present invention may include the means (D) that outputs a concentration of the component to be analyzed, wherein the cumulative distribution function uses any one of normal distribution, exponential distribution, binomial distribution, logistic distribution, and gamma distribution.

On the other hand, an analysis method of the present invention is an analysis method for a test liquid containing an agglutination-based immunological reagent and a component to be analyzed, the method including:

a step (a) that detects a prozone during measurement of the component to be analyzed; and a step (b) that determines a high concentration region by automatically determining a dilution rate of the test liquid.

In the analysis method of the present invention, in the step (a) that detects a prozone, a prozone detection may be conducted using an absorbance measurement result in a reaction course of the component to be analyzed.

Also, in the analysis method of the present invention, in the step (a) that detects a prozone, a prozone may be detected by referring to an absorbance measurement result in a reaction course of a calibration sample for the component to be analyzed that is measured in advance.

Also, in the analysis method of the present invention, in the step (b) that determines a high concentration region, a dilution rate of the test liquid may be determined by using an absorbance measurement result in a reaction course of the component to be analyzed.

Also, in the analysis method of the present invention, in the step (b) that determines a high concentration region, a dilution rate of the test liquid may be determined by referring to an absorbance measurement result in a reaction course of a calibration sample for the component to be analyzed that is measured in advance.

Also, in the analysis method of the present invention, the analysis method may further include a step (c) that dilutes the test liquid at the dilution rate determined by the step (b) that determines a high concentration region.

In the analysis method of the present invention, the component to be analyzed may include a tissue-derived component.

Also, an analysis method of the present invention is an analysis method for a test liquid containing an agglutination-based immunological reagent and a component to be analyzed, the method including:

a step (a) that detects a prozone during measurement of the component to be analyzed; and a step (d) that outputs a concentration of the component to be analyzed based on an absorbance measurement result in a reaction course of the component to be analyzed without accompanied by dilution reexamination.

The analysis method of the present invention may include the step (d) that outputs a concentration of the component to be analyzed using an initial time at which a threshold is exceeded in place of the absorbance measurement result in the reaction course.

Also, the analysis method of the present invention may include the step (d) that conducts nonlinear fitting for absorbance measurement result (y) and reaction time (x) in the reaction course, extracts a parameter, and outputs a concentration of the component to be analyzed.

Also, the analysis method of the present invention may include the step (d) that outputs a concentration of the component to be analyzed, wherein the nonlinear fitting uses a cumulative distribution function, or a function obtained by adding one or both of a constant of proportionality and a constant term to a cumulative distribution function.

Also, the analysis method of the present invention may include the step (d) that outputs a concentration of the component to be analyzed using a mode of a probability density function obtained by differentiating the cumulative distribution function as a parameter.

Also, the analysis method of the present invention may include the step (d) that outputs a concentration of the component to be analyzed, wherein the cumulative distribution function uses any one of normal distribution, exponential distribution, binomial distribution, logistic distribution, and gamma distribution.

On the other hand, a dilution device of the present invention is a dilution device for a test liquid containing an agglutination-based immunological reagent and a component to be analyzed, the device including:

means (A) that detects a prozone during measurement of the component to be analyzed;

means (B) that determines a high concentration region by automatically determining a dilution rate of the test liquid; and means (C) that dilutes the test liquid at the dilution rate determined by the means (B) that determines a high concentration region.

Also, a dilution method of the present invention is a dilution method for a test liquid containing an agglutination-based immunological reagent and a component to be analyzed, the method including:

a step (a) that detects a prozone during measurement of the component to be analyzed;

a step (b) that determines a high concentration region by automatically determining a dilution rate of the test liquid; and a step (c) that dilutes the test liquid at the dilution rate determined by the step (b) that determines a high concentration region.

Further, an immunological reagent of the present invention is an immunological reagent for use in the analysis device and the analysis method, and in the dilution device and the dilution method, the immunological reagent being designed to have an upper limit concentration that is measurable without dilution of 0.5 times to 1 time a concentration where a prozone occurs in the means (B) or the step (b) that determines a high concentration region.

In the immunological reagent of the present invention, the tissue-derived component may be an antigen or an antibody.

Effect of the Invention

According to the analysis device and the analysis method of the present invention, since the analysis device and the analysis method include the means (A) and the step (a) that detect a prozone during measurement of the component to be analyzed; and the means (B) and the step (b) that determine a high concentration region by automatically determining a dilution rate of the test liquid, it becomes possible to predict a concentration even for a high concentration sample that can be outside the measurement range as it is, by using an absorbance variation or the like in a reaction course even at the time of measurement of a test liquid containing a high concentration sample and an immunological reagent, and determine an optimum dilution rate to conduct measurement. The high concentration determination may be a function of determining whether the concentration falls in the measurement range by 10-fold dilution when the sample is detected to have a high concentration by the prozone detection. By automating the whole or part of the means and the steps, it becomes possible to achieve more simple and more rapid measurement and analysis.

When the device includes the means (C) that dilutes the test liquid at the dilution rate determined by the means (B) that determines a high concentration region, or the method includes the step (c) that dilutes the test liquid at the dilution rate determined by the step (b) that determines a high concentration region, it becomes possible to predict a concentration even for a high concentration sample that can be outside the measurement range as it is, by using an absorbance variation or the like in a reaction course even at the time of measurement of a test liquid containing a high concentration sample and an immunological reagent, and determine an optimum dilution rate to conduct measurement accompanied by the dilution. The dilution may be conducted automatically or manually for the component to be analyzed at the determined dilution rate with a diluent or the like. Therefore, measurement of a high concentration sample that has been difficult heretofore can be performed rapidly and more accurately without a burden on the measuring person, and also change in symptom of the patient can be easily observed and diagnosed. For example, a sample from a serious patient sometimes has high concentration, and is accompanied by a dilution operation every time in the follow-up observation, so that there has been a drawback in rapidity and accuracy. However, the present means enables more simple and more rapid grasping. Also, the analysis device of the present invention becomes an analysis device capable of more simple and more rapid measurement and analysis by automating the whole or part of the means up to the diluting means.

Further, according to the analysis device and the analysis method of the present invention, it becomes possible to output a concentration without accompanied by dilution reexamination even for a sample having high concentration that can be outside a measurement range as it is using an absorbance variation or the like in a reaction course at the time of measurement of a test liquid containing an immunological reagent and the sample. By automating the whole or part of the means and the steps, it becomes possible to achieve more simple and more rapid measurement and analysis.

Also, according to the dilution device and the dilution method of the present invention, it becomes possible to predict a concentration even fora sample having high concentration that can be outside a measurement range as it is using an absorbance variation or the like in a reaction course at the time of measurement of a test liquid containing an immunological reagent and the sample, and determine an optimum dilution rate to conduct the dilution. By automating the whole or part of the means and the steps, it becomes possible to achieve more simple and more rapid measurement and analysis.

Also, according to the immunological reagent of the present invention, since the immunological reagent is designed to have an upper limit concentration that is measurable without dilution of 0.5 times to 1 time a concentration where a prozone occurs in the means (B) or the step (b) that determines a high concentration region, it is possible to make the analysis device and the analysis method, and the dilution device and the dilution method more simple and more rapid.

DETAILED DESCRIPTION OF THE PREFERRED EMBODIMENT

Hereinafter, embodiments the present invention are described in detail.

Figure 1:
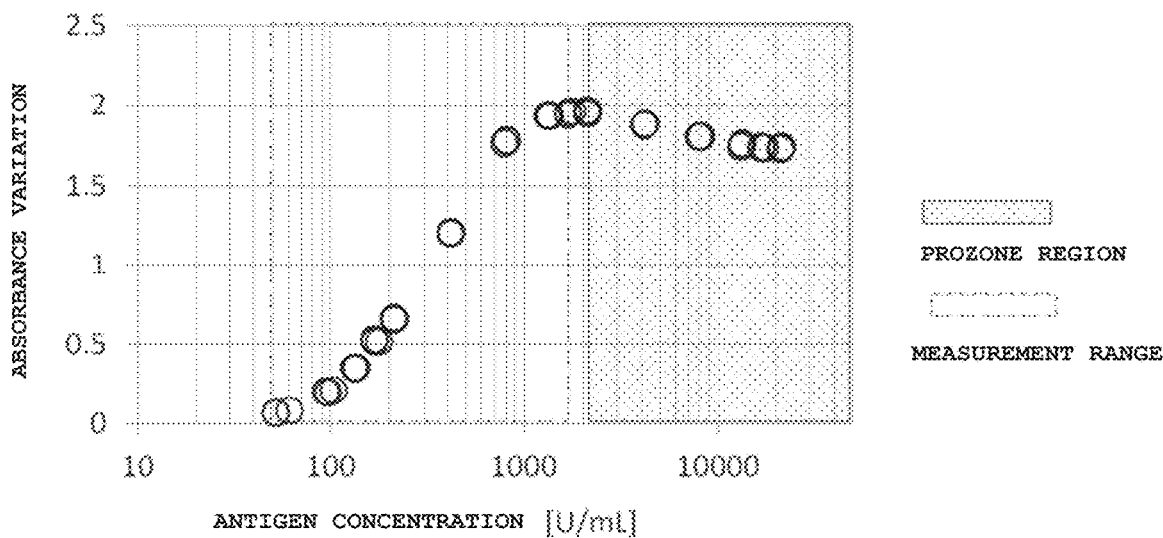
FIG. 1 shows one example of an explanatory view concerning antigen concentration and prozone in an immunoassay.

First, with reference to the explanatory view concerning antigen concentration and prozone illustrated in FIG. 1, the relation between antigen concentration (sample concentration, concentration of component to be analyzed) and prozone is described. In measurement using an immunological reagent, such as agglutination, concentration of antigen or antibody in the sample is measured based on the absorbance variation. Although monotone increasing is observed in the absorbance variation and the concentration in a measurement range (the region indicated by "measurement range" in FIG. 1), the absorbance variation tends to decrease with the concentration of the sample in a high concentration region (the region indicated by "prozone region" in FIG. 1). This region is called "prozone region" where accurate calculation of the concentration is very difficult to be made. Conventionally, when the prozone is detected after once conducting measurement, the measuring person conducts measurement repeatedly until the concentration falls within a proper measurement range by increasing or decreasing the dilution rate or the sample amount.

Figure 2:
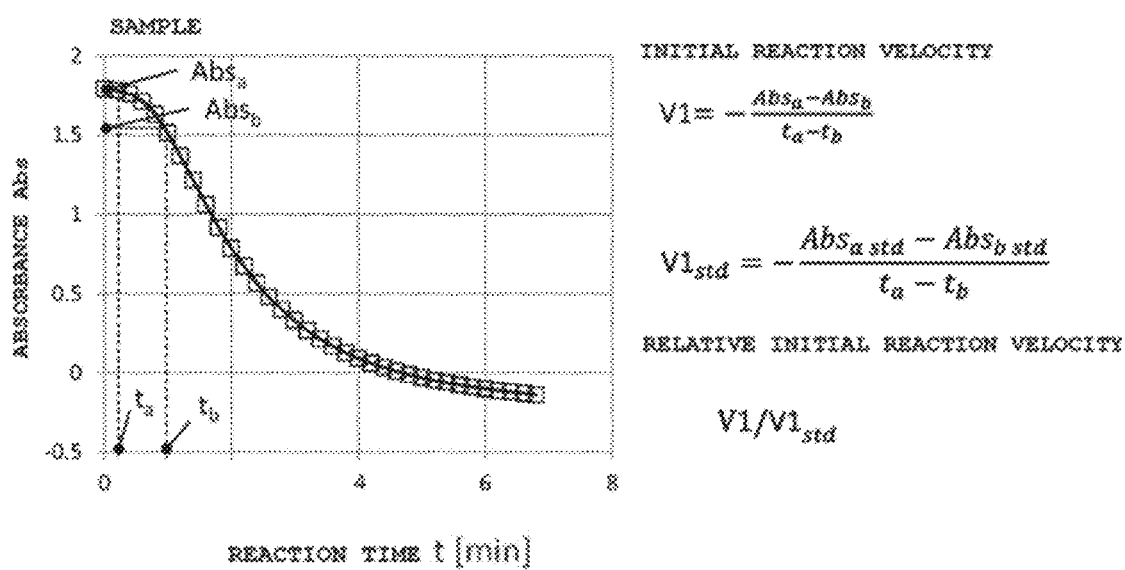
FIG. 2 shows one example of an explanatory view concerning initial reaction velocity.

Next, description concerning a measurement flow of the present invention is made. First, FIG. 2 illustrates an explanatory view concerning initial reaction velocity. As shown in FIG. 2, assuming that each difference in absorbance (Abs) between reaction times $t_a$ and $t_b$ are $Abs_a$ and $Abs_b$, an initial reaction velocity V1 is defined by the formula shown in FIG. 2. Similarly, an initial reaction velocity in a calibration sample for the component to be analyzed is defined as $V_{1std}$. In addition, a relative ratio of the initial reaction velocity V1 to the initial reaction velocity $V_{1std}$ in the calibration sample is defined as a relative initial reaction velocity $V1/V_{1std}$.

Figure 3:
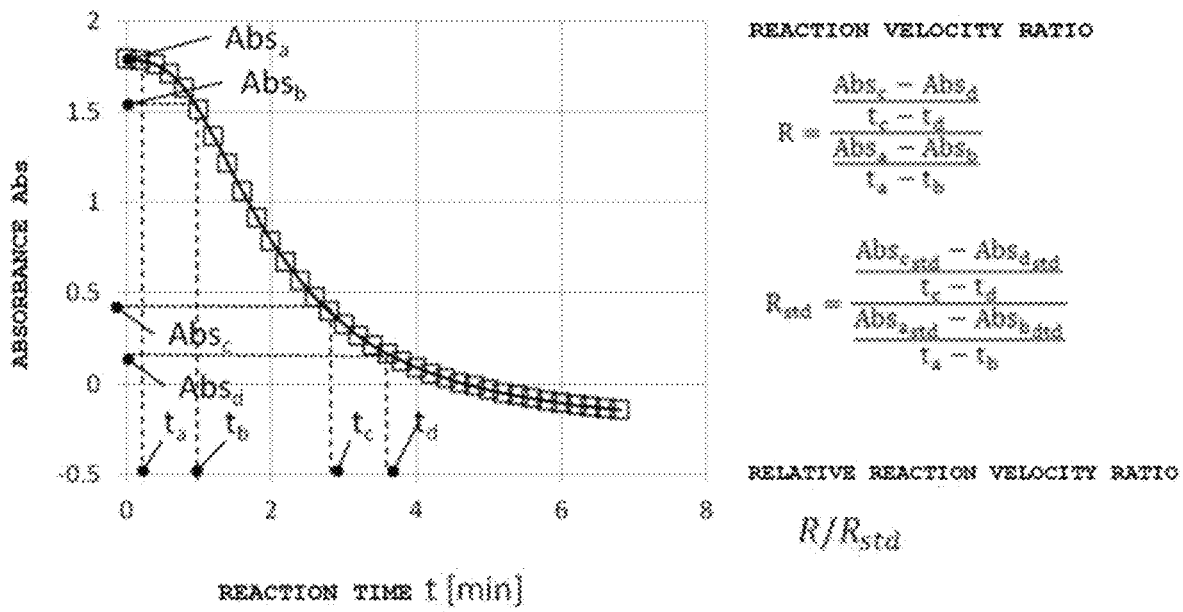
FIG. 3 illustrates an explanatory view concerning reaction velocity ratio.

FIG. 3 illustrates an explanatory view concerning reaction velocity ratio. As shown in FIG. 3, a reaction velocity ratio R of the reaction velocity V2 between the reaction times $t_c$ and $t_d$ to the initial reaction velocity V1 between the reaction times $t_c$ and $t_d$ is defined by the formula (V2/V1) shown in FIG. 3. Similarly, a reaction velocity ratio $R_{std}$ of the reaction velocity $V_{2std}$ between the reaction times $t_c$ and $t_d$ to the initial reaction velocity $V_{1std}$ between the reaction times $t_a$ and $t_b$ in the calibration sample is defined by the formula $(V_{2std}/V_{1std})$ shown in FIG. 3. In addition, a relative ratio of the reaction velocity ratio R to the reaction velocity ratio $R_{std}$ in the calibration sample is defined as a relative reaction velocity ratio $R/R_{std}$.

Figure 4:
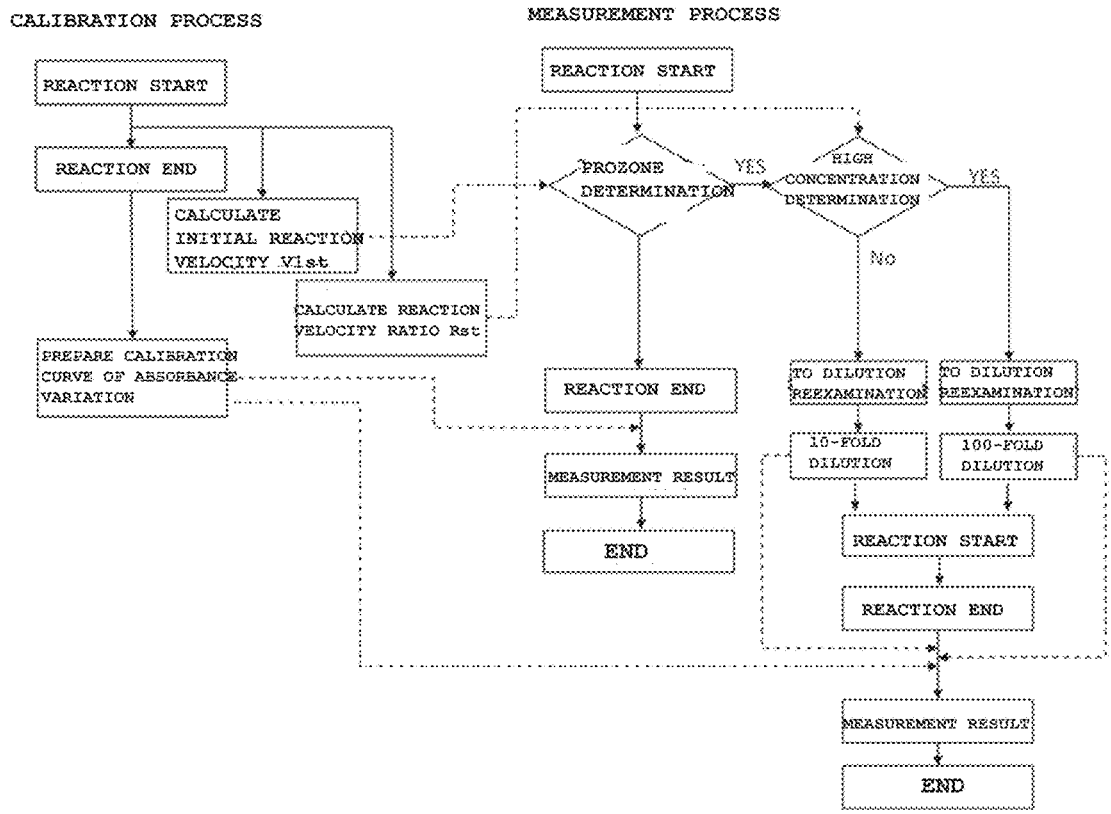
FIG. 4 shows one example of an explanatory view concerning a measurement flow in the present invention.

FIG. 4 illustrates an explanatory view concerning a measurement flow in the present invention. While FIG. 4 illustrates a measurement flow including a calibration process using a calibration sample for a component to be analyzed, and a measurement process of a component to be analyzed as a measurement flow, the measurement flow is not limited to this. First, in the calibration process using a calibration sample for a component to be analyzed, reaction between a calibration sample for a component to be analyzed, having a known concentration, and an immunological reagent is started, and measurement is conducted until end of the reaction, and a calibration curve of absorbance variation is prepared, and the reaction velocity $V_{1std}$ and the reaction velocity ratio $R_{std}$ are calculated.

Next, in the measurement process of a component to be analyzed, reaction between the component to be analyzed and the immunological reagent is started, and whether or not the sample falls within a prozone (prozone determination of detecting a prozone) is determined using the reaction velocity $V1_{std}$ in the reaction process (until end of the reaction), and when the sample is determined as being in the measurement range, the reaction is ended as is, and a measurement result is outputted or recorded to end the measurement. On the other hand, when the sample is determined as being in the prozone in the prozone determination, a determination regarding the degree of high concentration (high concentration determination) is conducted subsequently. In the high concentration determination, the reaction velocity ratio $R_{std}$ is used. In other words, the prozone detection determines whether the sample is a sample in need of dilution, and the high concentration determination determines an appropriate dilution rate. An appropriate dilution rate means a dilution rate for making the high concentration sample fall within the measurement range. For example, in a measurement system having a measurement range of 50 to 1000 U/mL, 10-fold dilution is an appropriate dilution rate for a sample of 2000 U/mL, and 100-fold is an appropriate dilution rate for a sample of 20000 U/mL. The high concentration determination is a function of estimating a concentration and determining an appropriate dilution rate even for a sample in the prozone region exceeding the upper limit of the measurement range.

FIG. 4 illustrates an example of conducting high concentration determination in which the sample is classified into two stages: the case where the sample can be rendered in the measurement range by 10-fold dilution, and the case where the sample can be rendered in the measurement range by 100-fold dilution, and determination is made for the case where the sample can be rendered in the measurement range by 100-fold dilution. The dilution rate and the flow after determination are not limited to these, but the dilution rate can be appropriately set depending on the component to be analyzed, and the measurement range and the reaction behavior of the immunological reagent and the like.

When it is determined that the sample can be rendered in the measurement range by 10-fold dilution in the high concentration determination, the sample is diluted 10-fold before conducting dilution reexamination, the reaction between the component to be analyzed and the immunological reagent is restarted, the reaction is ended as it is, and then a measurement result is outputted or recorded, to finish the measurement. Meanwhile, when it is determined that the sample can be rendered in the measurement range by 100-fold dilution (determined as not being rendered in the measurement range by 10-fold dilution) in the high concentration determination, the sample is diluted 100-fold before conducting dilution reexamination, the reaction between the component to be analyzed and the immunological reagent is restarted, the reaction is ended as it is, and then a measurement result is outputted or recorded, to finish the measurement.

On the other hand, when the concentration of the component to be analyzed is outputted based on an absorbance variation or the like in the reaction process of the component to be analyzed without conduction of dilution reexamination, the concentration can be outputted based on a high concentration calibration curve that is prepared in advance, in place of the high concentration determination. In this case, quantitative evaluation is enabled without conduction of dilution reexamination.

In the formula used in the high concentration determination, the sensitivity varies depending on the concentration, for example, the sensitivity is very poor at high concentration, and this sometimes makes it difficult to predict the concentration. Examples 7 and 8 show examples of a method of preparing a calibration curve in a high concentration region.

As a more specific method, time course data was fitted by a mathematical formula in which a correction term is added to a cumulative function of Y distribution, to extract a parameter. The value obtained by division of the parameter, and the concentration have a linear relationship, so that the line can be used as a calibration curve.

Hereinafter, configurations and elements in the present invention are described more specifically.

Figure 18:
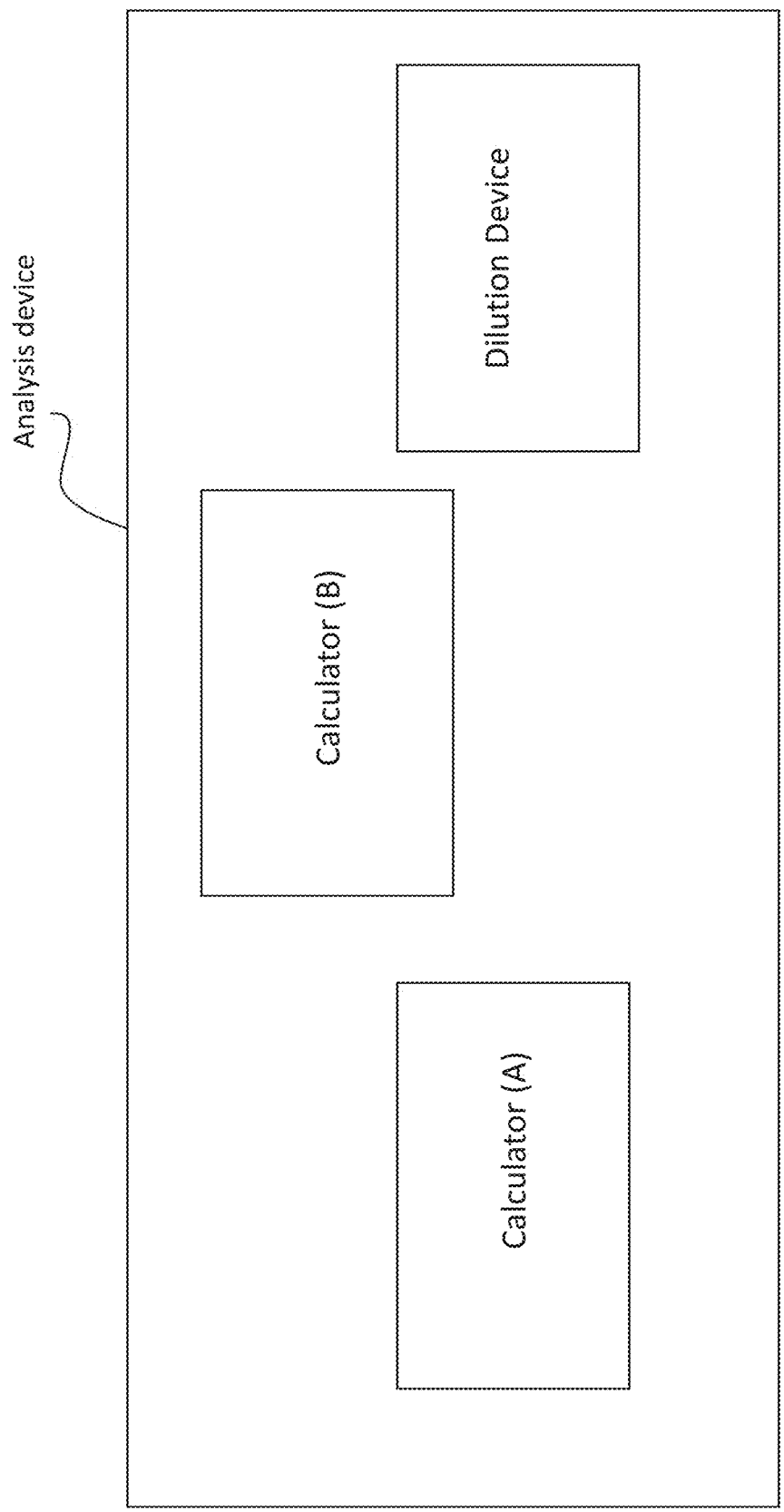
FIG. 18 shows an embodiment of an analysis device according to the present description.

An analysis device of the present invention shown in FIG. 18 is an analysis device for a test liquid containing an agglutination-based immunological reagent and a component to be analyzed, the device including:
  means (a), such as the calculator (a) illustrated in FIG. 18, that is configured to calculate and detectdeteets a prozone during measurement of the component to be analyzed; and
  means (b), such as the calculator (b) illustrated in FIG. 18, that is configured to calculate and determined fermines a high concentration region by automatically determining a dilution rate of the test liquid.

Since the analysis device of the present invention includes the means (A) that detects a prozone during measurement of the component to be analyzed; and the means (B) that determines a high concentration region by automatically determining a dilution rate of the test liquid, as described above, the analysis device of the present invention becomes an analysis device capable of predicting a concentration even for a high concentration sample that can be outside the measurement range as it is, by using an absorbance variation or the like in a reaction course even at the time of measurement of a test liquid containing a high concentration sample and an immunological reagent, and determining an optimum dilution rate, and thus conducting accurate measurement in a short time. Also, the analysis device of the present invention becomes an analysis device capable of more simple and more rapid measurement and analysis by automating the whole or part of the means.

The means (A) that detects a prozone during measurement of the component to be analyzed can be, for example, means that calculates the initial reaction velocity V1 and determines by using a threshold that is set in advance. By the means that determines based on the velocity in the initial stage after starting of the measurement, a prozone can be detected even in the initial stage of reaction. For example, in a measurement flow in which the measurement time of one sample is 10 minutes or 15 minutes, it becomes possible to detect a prozone at around 1 minute after starting of the reaction.

Also, in the analysis device of the present invention, the means (A) that detects a prozone may be detection means using an absorbance variation or the like in a reaction course of the component to be analyzed.

The absorbance variation in the present invention may be an absorbance variation at a specific wavelength, or may be a variation in difference between absorbances at specific wavelengths at two points. For example, when a colloidal gold reagent is used, difference between absorbances measured with the light of two wavelengths including a dominant wavelength of 540 nm (maximum absorption wavelength of colloidal gold particles that decreases with reaction) and a reference wavelength of 660 nm (absorption wavelength of colloidal gold particles that increases with reaction) can also be used.

Also, in the analysis device of the present invention, the detection means may be detection means that detects a prozone by referring to change in absorbance in a reaction course of a calibration sample for the component to be analyzed that is measured in advance. In the calibration process, by starting reaction between a calibration sample having a definite concentration or the like, and an immunological reagent, measuring until the reaction ends, to prepare a calibration curve of an absorbance variation or the like, and calculating the initial reaction velocity $V_{1std}$, it is possible to obtain a threshold with higher accuracy as a threshold in the prozone determination, in comparison with the upper limit initial reaction velocity in the calibration sample. Also, for different lots of the immunological reagent, a more appropriate, common threshold can be set as the threshold. This is effective for compensation of an error between different lots.

The means (B) that determines a high concentration region by automatically determining a dilution rate of the test liquid can be, for example, means that calculates the reaction velocity ratios R and $R_{std}$, and determines the degree of high concentration according to the calculated value (high concentration determination). By the means (B) that conducts high concentration determination, more simple, more rapid and more accurate measurement and analysis become possible even for a component to be analyzed for which re-measurement and dilution have been repeated relying on intuition or by repetitive trial and error until the sample falls within the measurable range heretofore.

Figure 7:
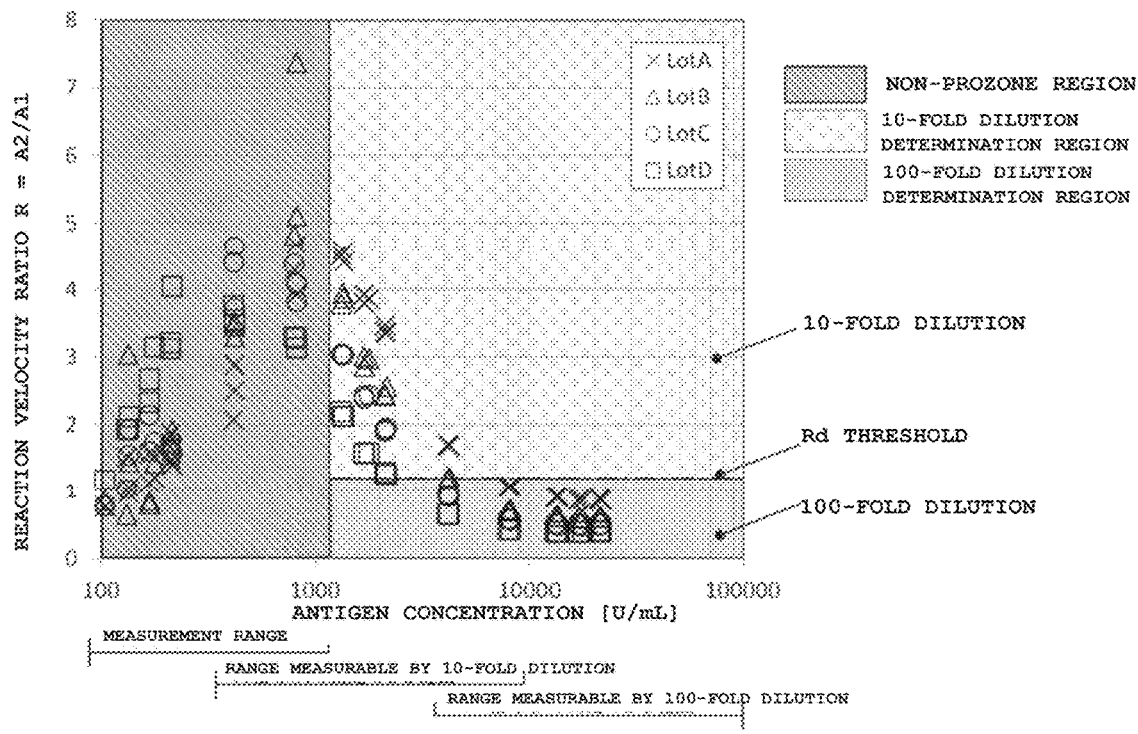
FIG. 7 shows a measurement result or the like in example 2 of the present invention.

Also, in the analysis device of the present invention, the means (B) that determines a high concentration region may be determination means that determines a dilution rate of the test liquid by using an absorbance variation or the like in a reaction course of the component to be analyzed. As shown in FIGS. 3, 7, for example, one exemplary means conducts 10-fold dilution when R Rd, and conducts 100-fold dilution when R<Rd assuming that reaction velocity ratio R (=V2/V1 (A2/A1)) of reaction velocity V2 between reaction times $t_c$ and $t_d$ (A2 in FIG. 7) to initial reaction velocity V1 between reaction times $t_a$ and $t_b$ (A1 in FIG. 7) is defined as a formula shown in FIG. 3, and a threshold (Rd) is set. The dilution concentration and the number of the branched flow after determination are not limited to the above, and for example, they can be appropriately set depending on the component to be analyzed, the immunological reagent, the reaction behavior and the like. For example, the dilution rate can be 2-fold, 3-fold, 5-fold 7-fold, 10-fold, 20-fold, 30-fold, 50-fold, 100-fold and so on, and the number of stages of the branched flow in the high concentration determination can be multiple besides two.

The reaction time $t_a$ to $t_b$ can be, for example, 0 to 30% and may be 0 to 5%, 5 to 10%, 10 to 15%, 15 to 20% and so on from the start when the total reaction time is 100%. For example, when the measurement time of the sample is 10 minutes, the reaction time can be 0 to 3 minutes, 0 to 1 minute, 1 to 2 minutes, 2 to 3 minutes and so on from starting of the measurement.

The reaction time $t_c$ to $t_d$ can be, for example, 10 to 40% and may be 10 to 15%, 15 to 20%, 20 to 25%, 25 to 30% and so on from the start when the total reaction time is 100%. For example, when the measurement time of the sample is 10 minutes, the reaction time can be 1 to 4 minutes, 1 to 2 minutes, 2 to 3 minutes, 3 to 4 minutes and so on from starting of the measurement. Although the reaction times $t_a$, $t_b$ and the reaction times $t_c$, $t_d$ may be overlapped in one section, it is to be noted that $t_a$ temporally precedes $t_c$.

Figure 8:
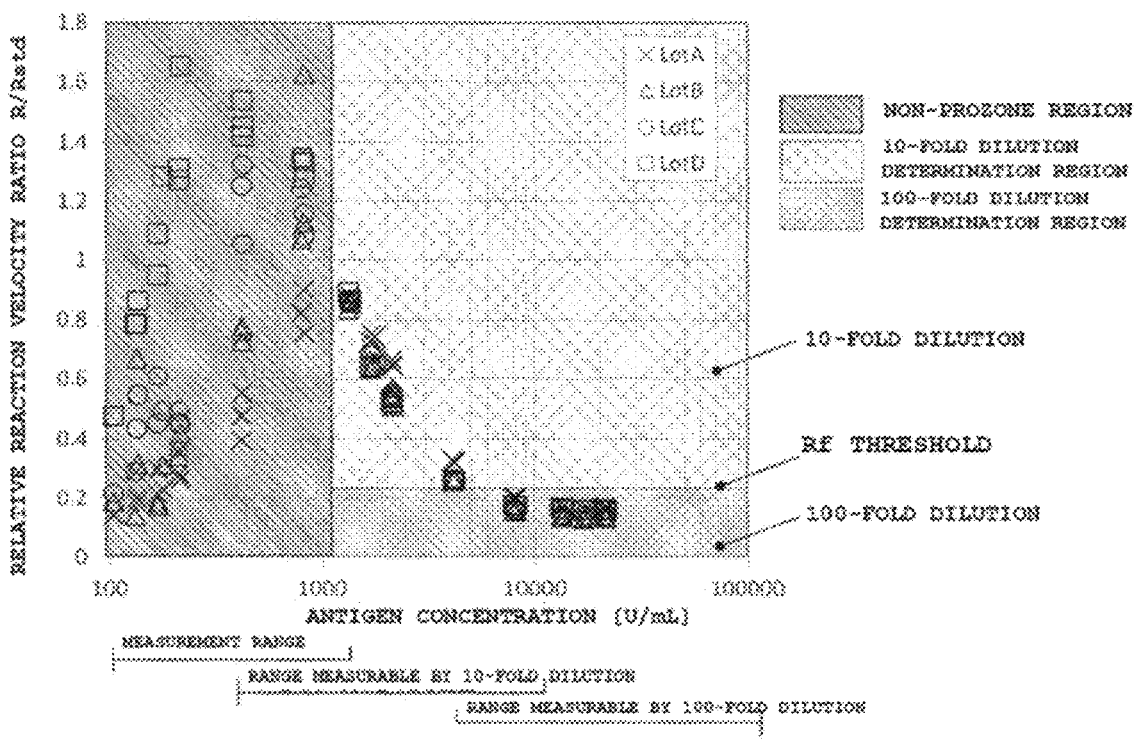
FIG. 8 shows a measurement result or the like in example 3 of the present invention.

Also, in the analysis device of the present invention, the determination means may be determination means that determines a dilution rate of the test liquid by referring to change in absorbance in a reaction course of a calibration sample for the component to be analyzed that is measured in advance. As shown in FIGS. 3, 8, for example, one exemplary means conducts 10-fold dilution when (R/R$_{std}$)≥Rf, and conducts 100-fold dilution when (R/R$_{std}$)<Rf assuming that a threshold (Rf) is set based on the relative reaction velocity ratio R/R$_{std}$ as shown in the formula shown in FIG. 3 using the reaction velocity ratio R (=V2/V1 (A2/A1)) of the reaction velocity V2 between the reaction times $t_c$ and $t_b$ to the reaction velocity V1 between the reaction times $t_a$ and $t_b$, and the reaction velocity ratio R$_{std}$ (=V2 std/V1 std) in the calibration sample. In the calibration process, by starting reaction between a calibration sample having a definite concentration or the like, and an immunological reagent, measuring until the reaction ends, to prepare a calibration curve of an absorbance variation or the like, calculating the reaction velocity ratio R$_{std}$, and using the relative reaction velocity ratio R/R$_{std}$, it is possible to obtain a threshold with higher accuracy as a threshold (Rf) in the high concentration determination, in comparison with the upper limit reaction velocity ratio in the calibration sample. Also, for different lots of the immunological reagent, a more appropriate, common threshold can be set as the threshold. This is effective for compensation of an error between different lots.

Also, in the analysis device of the present invention, the analysis device can further include means (c), such as the dilution device illustrated in FIG. 18, that is configured to diluted the test liquid at the dilution rate determined by the means (b) that determines a high concentration region. the means (c) that dilutes can be, for example, means that adds a solvent of the test liquid to the sample to be subjected to dilution reexamination so that the test liquid is diluted at the dilution rate. when the analysis device includes the means (c) that dilutes the test liquid at the dilution rate determined by the means (b) that determines a high concentration region, the analysis device becomes an analysis device capable of predicting a concentration even for a high concentration sample that can be outside the measurement range as it is, by using an absorbance variation or the like in a reaction course even at the time of measurement of a test liquid containing a high concentration sample and an immunological reagent, determining an optimum dilution rate, and performing the dilution to conduct the measurement. also, measurement of a high concentration sample that has been difficult heretofore can be performed rapidly and more accurately without a burden on the measuring person, and also change in symptom of the patient can be easily observed and diagnosed. for example, a sample from a serious patient sometimes has high concentration, and is accompanied by a dilution operation every time in the follow-up observation, so that there has been a drawback in rapidity and accuracy. however, the present means enables more simple and more rapid grasping. also, the analysis device of the present invention becomes an analysis device capable of more simple and more rapid measurement and analysis by automating the whole or part of the means up to the diluting means:

In addition, in the dilution device of the present invention, the function may be enabled by connecting the means (C) that dilutes to the analysis device that can include the means (B) that determines a high concentration region for the test liquid. Preferably, the means that dilutes may be part of the analysis device, and preferably by automating the whole or part up to the diluting means as one unit with the analysis device, still more simple and more rapid measurement becomes possible.

Also, an analysis device of the present invention is an analysis device for a test liquid containing an agglutination-based immunological reagent and a component to be analyzed, the device including:

means (A) that detects a prozone during measurement of the component to be analyzed; and means (D) that outputs a concentration of the component to be analyzed based on an absorbance variation or the like in a reaction course of the component to be analyzed without accompanied by dilution reexamination.

When the analysis device of the present invention includes the means (D) that outputs a concentration of the component to be analyzed based on an absorbance variation or the like in a reaction course of the component to be analyzed without accompanied by dilution reexamination, as described above, the analysis device becomes an analysis device capable of outputting a concentration without accompanied by dilution reexamination even for a high concentration sample that can be outside the measurement range as it is, by using an absorbance variation or the like in a reaction course at the time of measurement of a test liquid containing an immunological reagent and a sample. Also, the analysis device of the present invention becomes an analysis device capable of more simple and more rapid measurement and analysis by automating the whole or part of the means.

The analysis device of the present invention may include the means (D) that outputs a concentration of the component to be analyzed using a time at which a threshold is exceeded in place of the absorbance variation or the like in the reaction course.

Also, the analysis device of the present invention may include the means (D) that conducts nonlinear fitting for absorbance variation or the like (y) and reaction time (x) in the reaction course, extracts a parameter, and outputs a concentration of the component to be analyzed.

Also, the analysis device of the present invention may include the means (D) that outputs a concentration of the component to be analyzed, wherein the nonlinear fitting uses a cumulative distribution function, or a function obtained by adding one or both of a constant of proportionality and a constant term to a cumulative distribution function.

Also, the analysis device of the present invention may include the means (D) that outputs a concentration of the component to be analyzed using a mode of a probability density function obtained by differentiating the cumulative distribution function as a parameter.

Also, the analysis device of the present invention may include the means (D) that outputs a concentration of the component to be analyzed, wherein the cumulative distribution function uses any one of normal distribution, exponential distribution, binomial distribution, logistic distribution, and gamma distribution.

As the above function, those described below can be appropriately used.

Normal distribution [Mathematical formula 1]

$$g(x, \mu, \sigma) = \frac{1}{2}\left(1 + \mathrm{erf}\frac{(x-\mu)}{\sqrt{2\sigma^2}}\right)$$

Exponential distribution [Mathematical formula 2]

$$g(x, \lambda) = 1 - e^{-\lambda x}$$

Gamma distribution [Mathematical formula 3]

$$g(x, k, \theta) = \frac{r(k, x/\theta)}{\Gamma(k)}$$

Logistic distribution [Mathematical formula 4]

$$g(x, \mu, s) = \frac{1}{1 + e^{-(x-\mu)/s}}$$

Function group used for fitting [Mathematical formula 5]

$$y = f(x) = g(x)$$
$$y = f(x) = E \cdot g(x)$$
$$y = f(x) = g(x) + F$$
$$y = f(x) = E \cdot g(x) + F$$

On the other hand, an analysis method of the present invention is an analysis method for a test liquid containing an agglutination-based immunological reagent and a component to be analyzed, the method including:

a step (a) that detects a prozone during measurement of the component to be analyzed; and a step (b) that determines a high concentration region by automatically determining a dilution rate of the test liquid.

Since the analysis method of the present invention includes the step (a) that detects a prozone during measurement of the component to be analyzed; and the step (b) that determines a high concentration region by automatically determining a dilution rate of the test liquid, as described above, the analysis method of the present invention becomes an analysis method capable of predicting a concentration even for a high concentration sample that can be outside the measurement range as it is, by using an absorbance variation or the like in a reaction course even at the time of measurement of a test liquid containing a high concentration sample and an immunological reagent, and determining an optimum dilution rate, and thus conducting a measurement. The analysis method of the present invention becomes an analysis method capable of more simple and more rapid measurement and analysis by automating the whole or part of the steps.

The step (a) that detects a prozone during measurement of the component to be analyzed can be, for example, a step that calculates the initial reaction velocity V1 and determines by using a threshold that is set in advance. By the step that determines based on the velocity in the initial stage after starting of the measurement, a prozone can be detected even in the initial stage of reaction. For example, in a measurement flow in which the measurement time of one sample is 10 minutes or 15 minutes, it becomes possible to detect a prozone at around 1 minute after starting of the reaction.

Also, in the analysis method of the present invention, the step (a) that detects a prozone may be a detection step using an absorbance variation or the like in a reaction course of the component to be analyzed.

Also, in the analysis method of the present invention, the detection step may be a detection step that detects a prozone by referring to change in absorbance in a reaction course of the calibration sample for the component to be analyzed that is measured in advance. In the calibration process, by starting reaction between a calibration sample having a definite concentration or the like, and an immunological reagent, measuring until the reaction ends, to prepare a calibration curve of an absorbance variation or the like, and calculating the reaction velocity $V_{1std}$, it is possible to obtain a threshold with higher accuracy as a threshold in the prozone determination, in comparison with the upper limit initial reaction velocity in the calibration sample. Also, for different lots of the immunological reagent, amore appropriate, common threshold can be set as the threshold. This is effective for compensation of an error between different lots.

The step (b) that determines a high concentration region by automatically determining a dilution rate of the test liquid can be, for example, a step that calculates the reaction velocity ratios R and $R_{std}$, and determines the degree of high concentration according to the calculated value (high concentration determination). By the step (b) that conducts high concentration determination, more simple and more rapid measurement and analysis become possible even for a component to be analyzed for which re-measurement and dilution have been repeated relying on intuition or by repetitive trial and error until the sample falls within the measurable range heretofore.

Also, in the analysis method of the present invention, the step (b) that determines a high concentration region may be a determination step that determines a dilution rate of the test liquid by using an absorbance variation or the like in a reaction course of the component to be analyzed. As shown in FIGS. 3, 7, for example, one exemplary step conducts 10-fold dilution when R Rd, and conducts 100-fold dilution when R<Rd, assuming that reaction velocity ratio R (=V2/V1 (A2/A1)) of reaction velocity V2 between reaction times $t_c$ and $t_d$ (A2 in FIG. 7) to initial reaction velocity V1 between reaction times $t_a$ and $t_b$ (A1 in FIG. 7) is defined as a formula shown in FIG. 3, and a threshold (Rd) is set. The dilution concentration and the number of the branched flow after determination are not limited to the above, and for example, they can be appropriately set depending on the component to be analyzed, the immunological reagent, the reaction behavior and the like. For example, the dilution rate can be 2-fold, 3-fold, 5-fold 7-fold, 10-fold, 20-fold, 30-fold, 50-fold, 100-fold and so on, and the number of stages of the branched flow in the high concentration determination can be multiple besides two.

The reaction time $t_a$ to $t_b$ can be, for example, 0 to 30% and may be 0 to 5%, 5 to 10%, 10 to 15%, 15 to 20% and so on from the start when the total reaction time is 100%. For example, when the measurement time of the sample is 10 minutes, the reaction time can be 0 to 3 minutes, 0 to 1 minute, 1 to 2 minutes, 2 to 3 minutes and so on from starting of the measurement.

The reaction time $t_c$ to $t_d$ can be, for example, 10 to 40% and may be 10 to 15%, 15 to 20%, 20 to 25%, 25 to 30% and so on from the start when the total reaction time is 100%. For example, when the measurement time of the sample is 10 minutes, the reaction time can be 1 to 4 minutes, 1 to 2 minutes, 2 to 3 minutes, 3 to 4 minutes and so on from starting of the measurement. Although the reaction times $t_a$, $t_b$ and the reaction times $t_c$, $t_d$ may be overlapped in one section, it is to be noted that $t_a$ temporally precedes $t_c$.

Also, in the analysis method of the present invention, the determination step may be a determination step that determines a dilution rate of the test liquid by referring to change in absorbance in a reaction course of the calibration sample for the component to be analyzed that is measured in advance. As shown in FIGS. 3, 8, for example, one exemplary step conducts 10-fold dilution when $(R/R_{std})$ Rf, and conducts 100-fold dilution when $(R/R_{std}) < Rf$ assuming that a threshold (Rf) is set based on the relative reaction velocity ratio $R/R_{std}$ as shown in the formula shown in FIG. 3 using the reaction velocity ratio R $(=V2/V1)$ of the reaction velocity V2 between the reaction times $t_c$ and $t_d$ to the reaction velocity V1 between the reaction times $t_a$ and $t_b$, and the reaction velocity ratio $R_{std}$ $(=V_{2std}/V_{1std})$ in the calibration sample. In the calibration process, by starting reaction between a calibration sample having a definite concentration or the like, and an immunological reagent, measuring until the reaction ends, to prepare a calibration curve of an absorbance variation or the like, calculating the reaction velocity ratio $R_{std}$, and using the relative reaction velocity ratio $R/R_{std}$, it is possible to obtain a threshold with higher accuracy as a threshold (Rf) in the high concentration determination, in comparison with the upper limit reaction velocity ratio in the calibration sample. Also, for different lots of the immunological reagent, a more appropriate, common threshold can be set as the threshold. This is effective for compensation of an error between different lots.

Also, in the analysis method of the present invention, the analysis method can further include a step (c) that dilutes the test liquid at the dilution rate determined by the step (b) that determines a high concentration region. The step (c) that dilutes can be, for example, a step that adds a solvent of the test liquid to the sample to be subjected to dilution reexamination so that the test liquid is diluted at the dilution rate. When the analysis method includes the step (c) that dilutes the test liquid at the dilution rate determined by the step (b) that determines a high concentration region, the analysis method becomes an analysis method capable of predicting a concentration even for a high concentration sample that can be outside the measurement range as it is, by using an absorbance variation or the like in a reaction course even at the time of measurement of a test liquid containing a high concentration sample and an immunological reagent, determining an optimum dilution rate, and performing the dilution to conduct the measurement. Also, measurement of a high concentration sample that has been difficult heretofore can be performed rapidly and more accurately without a burden on the measuring person, and also change in symptom of the patient can be easily observed and diagnosed. For example, a sample from a serious patient sometimes has high concentration, and is accompanied by a dilution operation every time in the follow-up observation, so that there has been a drawback in rapidity and accuracy. However, the present means enables more simple and more rapid grasping.

In addition, in the dilution method of diluting according to the present invention, the function may be enabled by independently conducting the step of determining the test liquid by the step (b) that determines a high concentration region, and connecting the step (c) that dilutes. Preferably, by automating the whole or part integrally with the step (b) that determines a high concentration region, still more simple and more rapid measurement becomes possible.

Also, an analysis method of the present invention is an analysis method for a test liquid containing an agglutination-based immunological reagent and a component to be analyzed, the method including:

a step (a) that detects a prozone during measurement of the component to be analyzed; and a step (d) that outputs a concentration of the component to be analyzed based on an absorbance variation or the like in a reaction course of the component to be analyzed without accompanied by dilution reexamination.

When the analysis method of the present invention includes the step (d) that outputs a concentration of the component to be analyzed based on an absorbance variation or the like in a reaction course of the component to be analyzed without accompanied by dilution reexamination, as described above, the analysis method becomes an analysis method capable of outputting a concentration without accompanied by dilution reexamination even for a high concentration sample that can be outside the measurement range as it is, by using an absorbance variation or the like in a reaction course at the time of measurement of a test liquid containing an immunological reagent and a sample. The analysis method of the present invention becomes an analysis method capable of more simple and more rapid measurement and analysis by automating the whole or part of the steps.

Also, the analysis method of the present invention may include the step (d) that outputs a concentration of the component to be analyzed using a time at which a threshold is exceeded in place of the absorbance variation or the like in the reaction course.

Also, the analysis method of the present invention may include the step (d) that conducts nonlinear fitting for absorbance variation or the like (y) and reaction time (x) in the reaction course, extracts a parameter, and outputs a concentration of the component to be analyzed.

Also, the analysis method of the present invention may include the step (d) that outputs a concentration of the component to be analyzed, wherein the nonlinear fitting uses a cumulative distribution function, or a function obtained by adding one or both of a constant of proportionality and a constant term to a cumulative distribution function.

Also, the analysis method of the present invention may include the step (d) that outputs a concentration of the component to be analyzed using a mode of a probability density function obtained by differentiating the cumulative distribution function as a parameter.

Also, the analysis method of the present invention may include the step (d) that outputs a concentration of the component to be analyzed, wherein the cumulative distribution function uses any one of normal distribution, exponential distribution, binomial distribution, logistic distribution, and gamma distribution.

As the above function, those described below can be appropriately used.

Normal distribution [Mathematical formula 6]

$$g(x, \mu, \sigma) = \frac{1}{2}\left(1 + \text{erf}\frac{(x-\mu)}{\sqrt{2\sigma^2}}\right)$$

Exponential distribution [Mathematical formula 7]

$$g(x, \lambda) = 1 - e^{-\lambda x}$$

Gamma distribution [Mathematical formula 8]

$$g(x, k, \theta) = \frac{r(k, x/\theta)}{\Gamma(k)}$$

Logistic distribution [Mathematical formula 9]

$$g(x, \mu, s) = \frac{1}{1 + e^{-(x-\mu)/s}}$$

Function group used for fitting [Mathematical formula 10]

$$y = f(x) = g(x)$$
$$y = f(x) = E \cdot g(x)$$
$$y = f(x) = g(x) + F$$
$$y = f(x) = E \cdot g(x) + F$$

On the other hand, a dilution device of the present invention is a dilution device for a test liquid containing an agglutination-based immunological reagent and a component to be analyzed, the device including:

means (A) that detects a prozone during measurement of the component to be analyzed;

means (B) that determines a high concentration region by automatically determining a dilution rate of the test liquid; and means (C) that dilutes the test liquid at the dilution rate determined by the means (B) that determines a high concentration region.

Since the dilution device of the present invention includes the means (A) that detects a prozone during measurement of the component to be analyzed; the means (B) that determines a high concentration region by automatically determining a dilution rate of the test liquid; and the means (C) that dilutes the test liquid at the dilution rate determined by the means (B) that determines a high concentration region, as described above, the dilution device of the present invention becomes a dilution device capable of predicting a concentration even for a high concentration sample that can be outside the measurement range as it is, by using an absorbance variation or the like in a reaction course at the time of measurement of a test liquid containing an immunological reagent and a sample, and determining an optimum dilution rate, and thus conducting the dilution. The analysis device of the present invention becomes an analysis device capable of more simple and more rapid measurement and analysis by automating the whole or part of the means. For the respective configurations of the means (A), (B) and (C), and reagents and the like, means that are same as those described above can be appropriately used.

Also, a dilution method of the present invention is a dilution method for a test liquid containing an agglutination-based immunological reagent and a component to be analyzed, the method including:

a step (a) that detects a prozone during measurement of the component to be analyzed;

a step (b) that determines a high concentration region by automatically determining a dilution rate of the test liquid; and a step (c) that dilutes the test liquid at the dilution rate determined by the step (b) that determines a high concentration region.

Since the dilution method of the present invention includes the step (a) that detects a prozone during measurement of the component to be analyzed; the step (b) that determines a high concentration region by automatically determining a dilution rate of the test liquid; and the step (c) that dilutes the test liquid at the dilution rate determined by the step (b) that determines a high concentration region, as described above, the dilution method is capable of predicting a concentration even for a high concentration sample that can be outside the measurement range as it is, by using an absorbance variation or the like in a reaction course at the time of measurement of a test liquid containing an immunological reagent and a sample, and determining an optimum dilution rate, and thus conducting the dilution. The analysis method of the present invention becomes an analysis method capable of more simple and more rapid measurement and analysis by automating the whole or part of the steps. As the respective configurations of the steps (a), (b) and (c), and reagents and the like, steps that are same as those described above can be appropriately used.

Further, an immunological reagent of the present invention is an immunological reagent for use in the analysis device and the analysis method, and in the dilution device and the dilution method, the immunological reagent being designed to have an upper limit concentration that is measurable without dilution of 0.5 times to 1 time a concentration where a prozone occurs in the means (B) or the step (b) that determines a high concentration region.

By configuring the immunological reagent of the present invention as described above, it is possible to make the analysis device and the analysis method, and the dilution device and the dilution method more simple and more rapid.

While the immunological reagent of the present invention is an immunological reagent that is designed to have an upper limit concentration that is measurable without dilution of 0.5 times to 1 time a concentration where a prozone occurs, the immunological reagent of the present invention may be an immunological reagent that is designed to have the concentration of 0.6 times to 0.9 times, an immunological reagent that is designed to have the concentration of 0.8 times to 1 time, or an immunological reagent that is designed to have the concentration of 0.5 times to 0.8 times.

The agglutination-based immunological reagent in the present invention refers to an immunological reagent for which an absorbance, a transmissivity or the like at a specific wavelength can be measured by an absorptiometer, and any immunological reagent that causes an antigen-antibody reaction with the component to be analyzed can be appropriately used. Examples of the immunological reagent include a colloidal gold reagent, a latex reagent, a metallic particle reagent, a silica particle reagent, and an immunonephelometric reagent. Among these, a colloidal gold reagent or a latex reagent is preferred.

Also, as the component to be analyzed in the present invention, any components that can be measured and analyzed by the agglutination-based immunological reagent can be used without particular limitation. The component to be analyzed may include a tissue-derived component. Examples of the component to be analyzed include calprotectin, lactoferin, hemoglobin, transferrin, immunoglobulin, C-reactive protein, albumin, macroalbumin, ferritin, α fetoprotein, cystatin C, human chorionic gonadotropin, luteinizing hormone, folicle stimulating hormone, and prostate-specific antigen. Among these, calprotectin, lactoferin, hemoglobin, or transferrin is preferred because it can be suitably measured and analyzed. By using the analysis device and the analysis method of the present invention, it becomes possible to conduct quantitative measurement and analysis simply and rapidly even for a component to be analyzed for which rapid and accurate quantification have been conventionally difficult because such a component is mixed in wide concentration distribution in many samples.

Also, in the present invention, a test liquid containing an agglutination-based immunological reagent and a component to be analyzed is used, and the test liquid may appropriately contain, besides the immunological reagent and the component to be analyzed, a solvent, an additive and the like required for preparation of the test liquid unless the operation and effect of the present invention is hindered. Examples of the solvent include water, alcohol, saline, a diluent, and a buffer. Examples of the additive include acid, base, a pH regulator, an inorganic salt, saccharides, amino acids, a chelating agent, a surfactant, a stabilizer, a dispersant, and a pigment. Examples of the test liquid containing a tissue-derived component include liquids containing human or animal blood, bone marrow and the like, fecal suspensions in which human or animal feces are dispersed, human or animal urine for examination or pooled urine, saliva, pituita, and mucosal wipe.

Also, in the analysis device and the analysis method, and the dilution device and the dilution method of the present invention, as respective configurations of other means, steps and the like, those known in the art can be appropriately used.

EXAMPLES

Hereinafter, examples and the like that specifically show the configuration and the effect of the present invention will be described. The evaluation items in examples and the like were measured in the following manner.
<Preparation of Measurement Reagent>
A fecal calprotectin colloidal gold measurement reagent was composed of two liquid reagents: R1 buffer and R2 colloidal gold reaction liquid described below.
R1 Buffer
To 100 mM HEPES buffer containing 3% sodium chloride, 0.05% surfactant and so on, polyethylene glycol 20000 was added to give an R1 buffer.
R2 Colloidal Gold Reaction Liquid
An anti-human calprotectin mouse monoclonal antibody was diluted with 10 mM HEPES (pH 7.1) buffer containing 0.05% sodium azide to prepare a solution having a concentration of 50 μg/mL. To 1 L of a colloidal gold solution, 100 mL of this solution was added, and stirred for 2 hours in a refrigerated condition. Next, 110 mL of 10 mM. HEPES (pH 7.1) buffer containing 0.5% BSA was added, and stirred at 37° C. for 90 minutes. The resultant solution was centrifuged at 12000 G for 40 minutes, and the supernatant was removed, and then 1 L of 10 mM HEPES (pH 7.5) buffer containing 0.1% BSA was added to disperse an antibody-sensitized colloidal gold, and then centrifuged again at 12000 G for 40 minutes, and the supernatant was removed, and an antibody-bound colloidal gold was dispersed with 10 mM HEPES (pH 7.5) buffer containing 0.1% BSA to have a total volume of 160 mL, and thus an anti-calprotectin antibody-bound colloidal gold reagent was prepared. The antibody-bound colloidal gold reagent was diluted with a buffer containing a stabilizer or the like so that the absorbance at 540 nm was 10, to give an R2 colloidal gold reaction liquid.
<Preparation of Sample>
Calprotectin derived from human leukocyte was added to a fecal solution, to give a high concentration calprotectin sample. The high concentration calprotectin sample was diluted with the fecal solution in 1, 0.8, 0.6, 0.4, 0.2, 0.1, 0.08, 0.06, 0.04, 0.02, 0.01, 0.008, 0.006, 0.004, and 0.002 folds to give samples.
<Measurement of Absorbance>
Measurement of absorbance was conducted using Automated Analyzer Hemotect NS-Prime (available from OTSUKA ELECTRONICS Co., LTD). More specifically, a sample, the R1 buffer, and the R2 reaction liquid were added in a liquid quantity ratio of 1:14:5, and reacted at 37° C., and the absorbance during the reaction was measured with light of two wavelengths: 540 nm as a dominant wavelength (maximum absorption wavelength of colloidal metal particles that decreases with the reaction) and 660 nm as a reference wavelength (absorption wavelength of colloidal metal particles that increases with the reaction), and difference between the absorbances measured with the light of two wavelengths was indicated as a difference in absorbance in each chart.

Example 1-1

Figure 5:
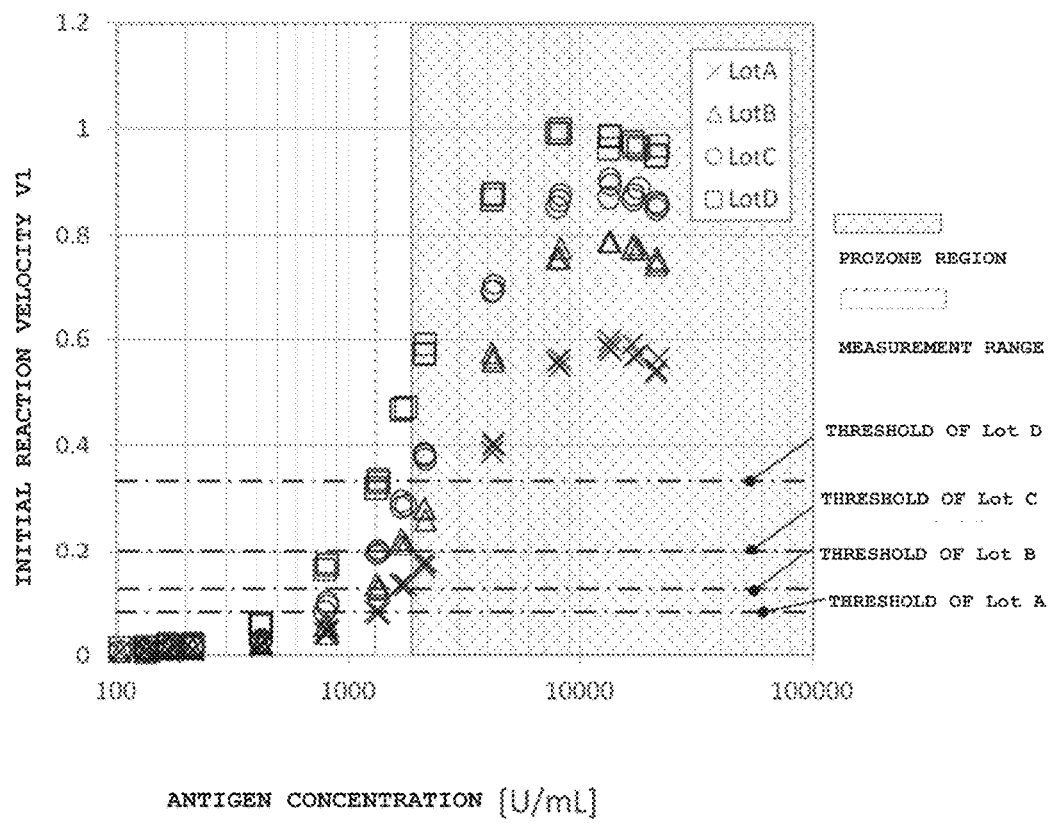
FIG. 5 shows a measurement result or the like in example 1-1 of the present invention.

Results concerning prozone detection are shown.
For samples diluted in 0.002 to 1-fold, using four kinds of fecal calprotectin colloidal metal measuring reagents LotA, LotB, LotC, LotD having different component concentrations of R1 as an example of reagents of different lots, the respective absorbance variation, initial reaction velocity V1 and the like were measured, and a range that can be measured as it is (measurement range) and a prozone region were detected, and a threshold in each reagent was calculated. The measurement time of each sample was 6.8 minutes. Among the four kinds of measurement reagents, LotD showed the prozone at the lowest concentration, and the prozone was observed from 1300 U/mL. On the other hand, LotA showed the prozone at the highest concentration among the four kinds of measurement reagents, and the prozone was observed from 2180 U/mL (not shown). Using the result obtained in LotD, as the prozone region, prozone determination and comparison of the initial reaction velocity V1 between different reagents were conducted as shown in FIG. 5.
In this case, respective thresholds of LotA, LotB, LotC, and LotD were distributed between 0 to 0.4 of the initial reaction velocity V1 value on the vertical axis.

Example 1-2

Figure 6:
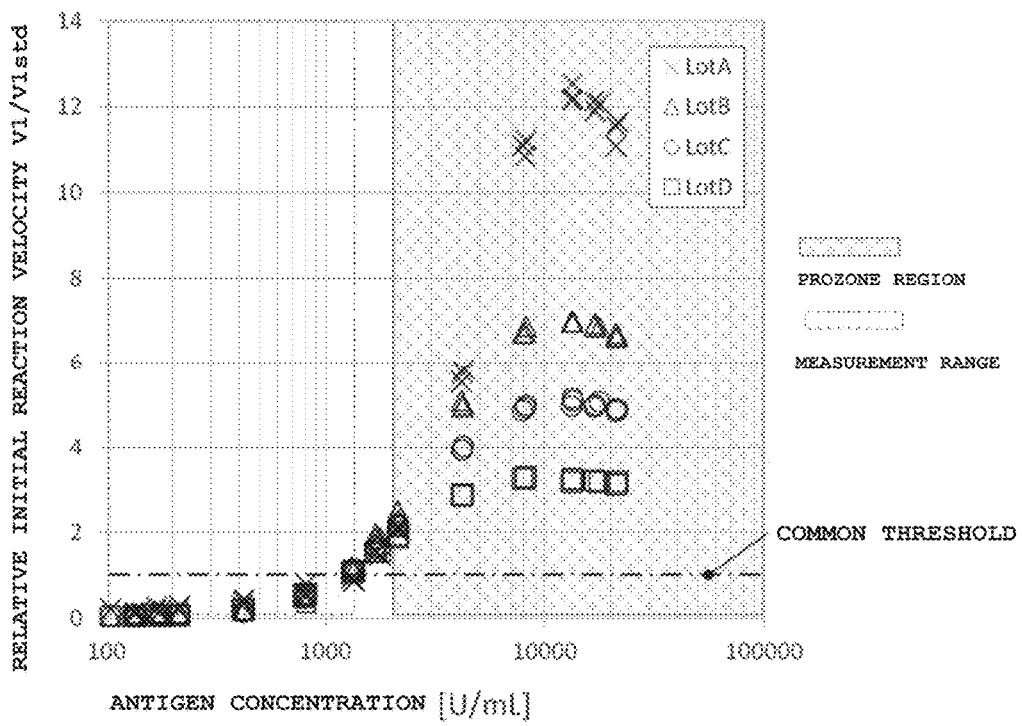
FIG. 6 shows a measurement result or the like in example 1-2 of the present invention.

Results concerning prozone detection are shown.
As shown in FIG. 6, using the initial reaction velocity $V_{1std}$ of the calibration sample in addition to the result obtained in Example 1-1, the relative initial reaction velocity $V1/V_{1std}$ was calculated. In the same manner as in Example 1-1, prozone determination and comparison in relative initial reaction velocity $V1/V_{1std}$ between different reagents were conducted. In this case, thresholds of LotA, LotB, LotC, and LotD were obtained between 0.8 and 1.2 of the relative initial reaction velocity $V1/V_{1std}$ value on the vertical axis. It was found that a threshold regarding prozone determination needs to be individually set for each lot in Example 1-1, while a common threshold can be used irrespective of lots in Example 1-2.

Example 2

Results concerning prozone detection and high concentration determination using the measurement data in Example 1-1 are shown. As shown in FIG. 7 and Table 1, using LotA, LotB, LotC, and LotD, the reaction velocity ratio R (=A2/A1) of the reaction velocity A2 in the reaction time between 1 and 2 minutes to the reaction velocity A1 in the reaction time between 0 and 1 minutes was calculated. High concentration determination and comparison in reaction velocity ratio between different reagents were conducted, and a measurement range that is measurable as it is, a range that is measurable by 10-fold dilution, and a range that is measurable by 100-fold dilution were as shown in the drawings. While there was a lot-to-lot difference in reaction velocity ratio, the range that is measurable by 10-fold dilution and the range that is measurable by 100-fold dilution were partly overlapped with each other, and by setting the threshold (Rd) at 1.0, determination of an appropriate dilution rate (high concentration determination) could be made in all the lots.

TABLE 1

|  |  | LotA | LotB | LotC | LotD |
|---|---|---|---|---|---|
| Rd = 1.0 | 21200 | 0.87 | 0.61 | 0.50 | 0.40 |
|  | 16900 | 0.87 | 0.60 | 0.50 | 0.39 |
|  | 13400 | 0.90 | 0.62 | 0.50 | 0.40 |
|  | 8150 | 1.06 | 0.71 | 0.57 | 0.44 |
|  | 4190 | 1.69 | 1.20 | 0.93 | 0.65 |
|  | 2120 | 3.37 | 2.46 | 1.94 | 1.28 |
|  | 1770 | 3.86 | 2.87 | 2.40 | 1.58 |

Example 3

Results of conducting prozone detection and high concentration determination are shown. As shown in FIG. 8 and Table 2, a graph concerning the relative reaction velocity ratio $R/R_{std}$ was calculated using the reaction velocity ratio $R_{std}$ of the calibration sample in addition to the result of Example 2. FIG. 8 shows results of high concentration determination, relative reaction velocity ratio of each reagent, and comparison of a measurement range that is measurable as it is, a range that is measurable by 10-fold dilution, and a range that is measurable by 100-fold dilution. In comparison with Example 2, distribution of the relative reaction velocity ratio was less likely to be influenced by lot-to-lot variation. Also, it was found that successful division irrespective of lots is enabled by setting the threshold (Rf) at 0.2. It was found that the high concentration determination was more stable in Example 3 compared with Example 2 since Example 3 is less likely to be influenced by lot-to-lot variation.

TABLE 2

|  |  | LotA | LotB | LotC | LotD |
|---|---|---|---|---|---|
| Rf = 0.2 | 21200 | 0.17 | 0.13 | 0.14 | 0.16 |
|  | 16900 | 0.17 | 0.13 | 0.14 | 0.16 |
|  | 13400 | 0.17 | 0.14 | 0.14 | 0.16 |
|  | 8150 | 0.20 | 0.16 | 0.16 | 0.18 |
|  | 4190 | 0.32 | 0.27 | 0.27 | 0.27 |
|  | 2120 | 0.65 | 0.54 | 0.55 | 0.52 |
|  | 1770 | 0.74 | 0.64 | 0.68 | 0.65 |

Examples 4 to 6

Figure 9:
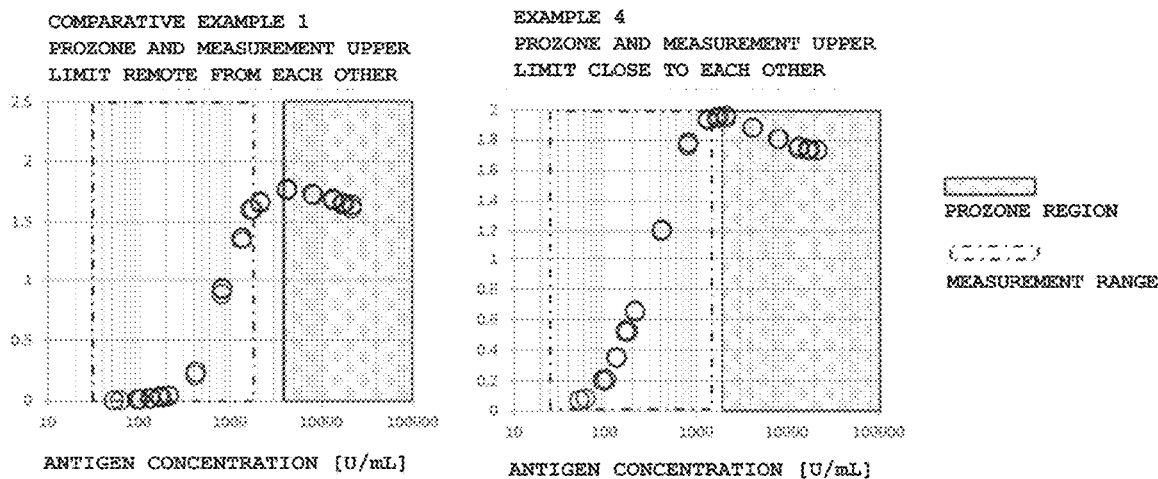
FIG. 9 shows measurement results or the like in example 4 and comparative example 1 of the present invention.

As shown in FIG. 9, for immunological reagents suited for high concentration determination, suitable sensitivity conditions were tested. In addition to the result of Example 1, a reagent having extremely small sensitivity (Comparative Example 1) was prepared, and measurement was conducted in the same manner as in Examples 1 and 3. While the prozone was 4200 U/mL when the reagent of Comparative Example 1 was used, the prozone was 2180 U/mL in Example 4 (reagent LotA in Example 1).

Figure 10:
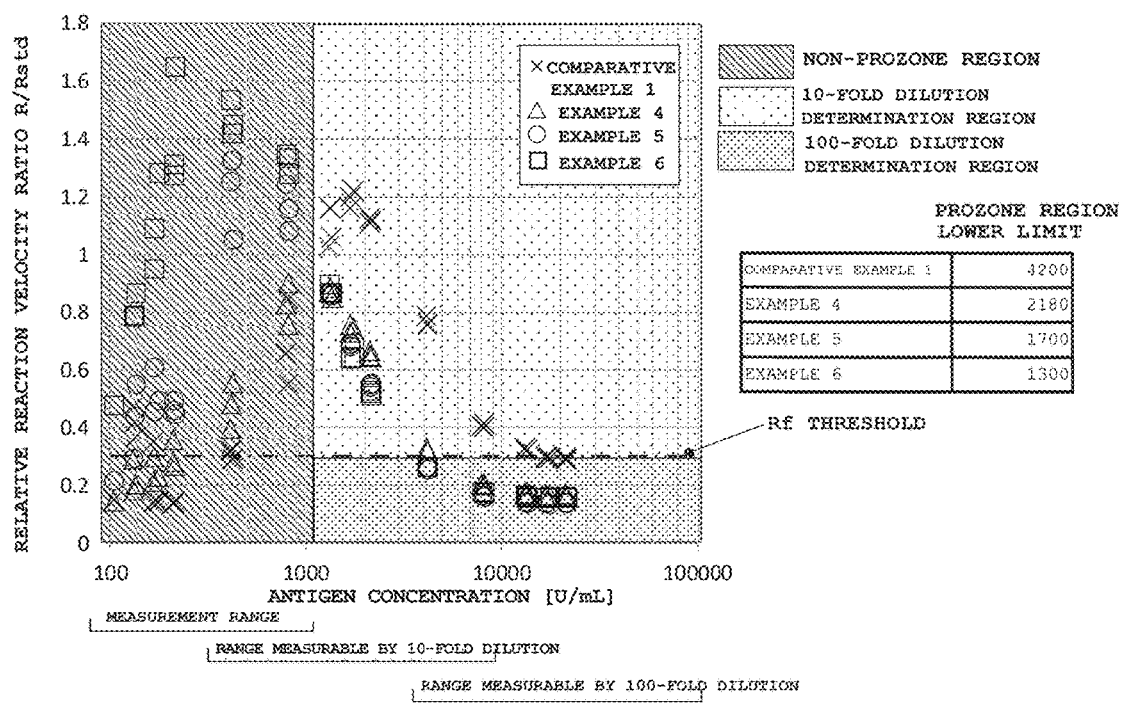
FIG. 10 shows measurement results or the like in examples 4 to 6 of the present invention.

As shown in FIG. 10, using two kinds of reagents (reagent lots LotC, and LotD in Example 1) in addition to Example 4, comparison of high concentration determination of the present invention was made. More specifically, for four kinds of immunological reagents that are different in sensitivity as shown in FIG. 10, a prozone occurring region and high concentration determination (relative reaction velocity ratio) were compared, and the relative reaction velocity ratio showed an extremely large value in Comparative Example 1. Also, at this time, a lower limit of a prozone region of each immunological reagent used was shown. In Examples 4 to 6, the lower limit of the prozone region was close to (1 to 2 times) the measurement range (1200), whereas in Comparative Example 1, the lower limit of the prozone region was remote (4 times) from the measurement range. This result infers that the sensitivity condition suited for an immunological reagent is that the lower limit of the prozone region is about 1 to 2 times the measurement range.

Example 7

Figure 11:
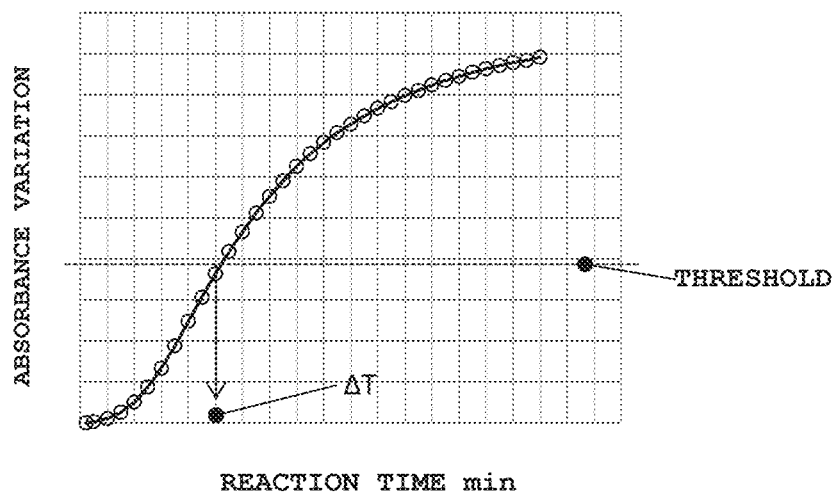
FIG. 11 shows an explanatory view concerning calculation of at in example 7 of the present invention.

The following is description of an analysis device or an analysis method having the means (D) or the step (d) that outputs a concentration of the component to be analyzed from the time at which the threshold of the absorbance variation in a reaction course is exceeded. As shown in FIG. 11, the reaction time was plotted on the horizontal axis, and the absorbance variation was plotted on the vertical axis. The time at the intersection between the preset threshold and the reaction curve was defined as ΔT. Concentration of the component to be analyzed was outputted while taking the ΔT as a feature.

Figure 12:
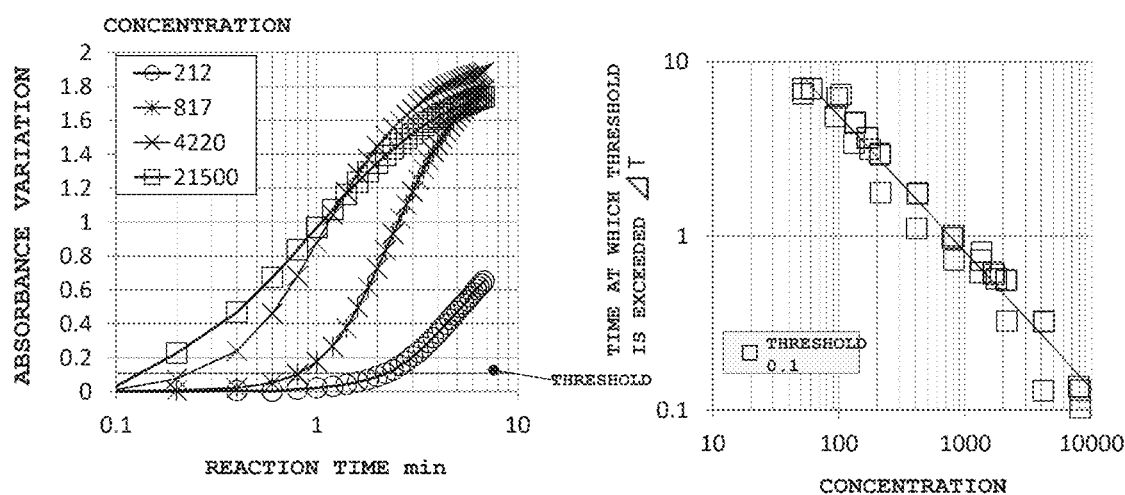
FIG. 12 shows a measurement result or the like in example 7 of the present invention.

FIG. 12 shows a result of measurement of calprotectin. The reaction time was plotted on the horizontal axis, and the absorbance variation was plotted on the vertical axis. When the threshold was set at 0.1, the relation between ΔT and the concentration was linear relation in the log-log plotting, revealing that the concentration of the component to be analyzed and ΔT have a relation of a power function ($Y=aX^b$). By using the high concentration calibration curve using this correlation, it is possible to output the concentration of the object to be analyzed without conducting dilution.

Example 8

Figure 13:
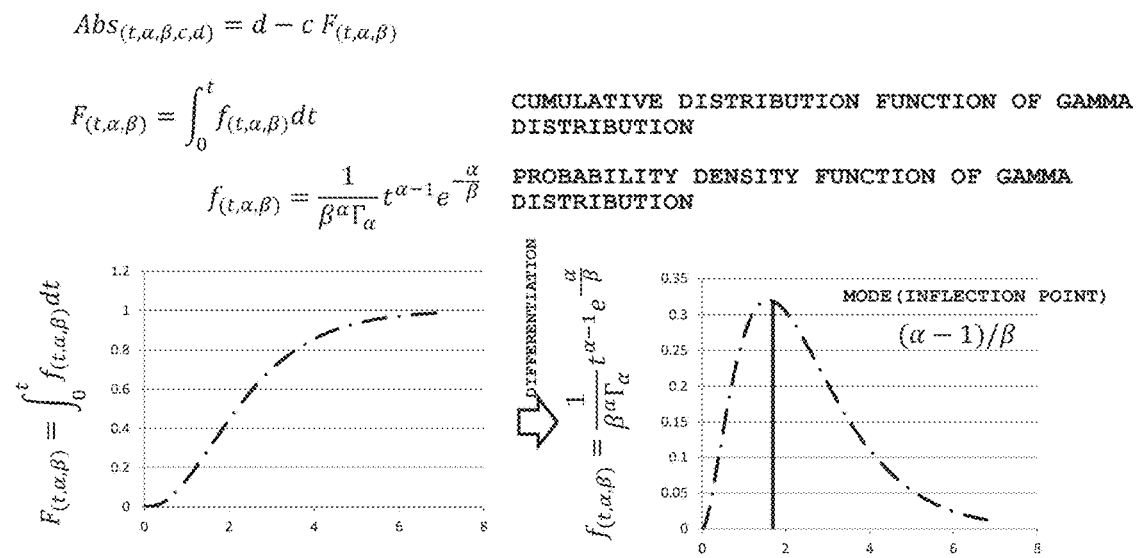
FIG. 13 shows an explanatory view in example 8 of the present invention.
Figure 14:
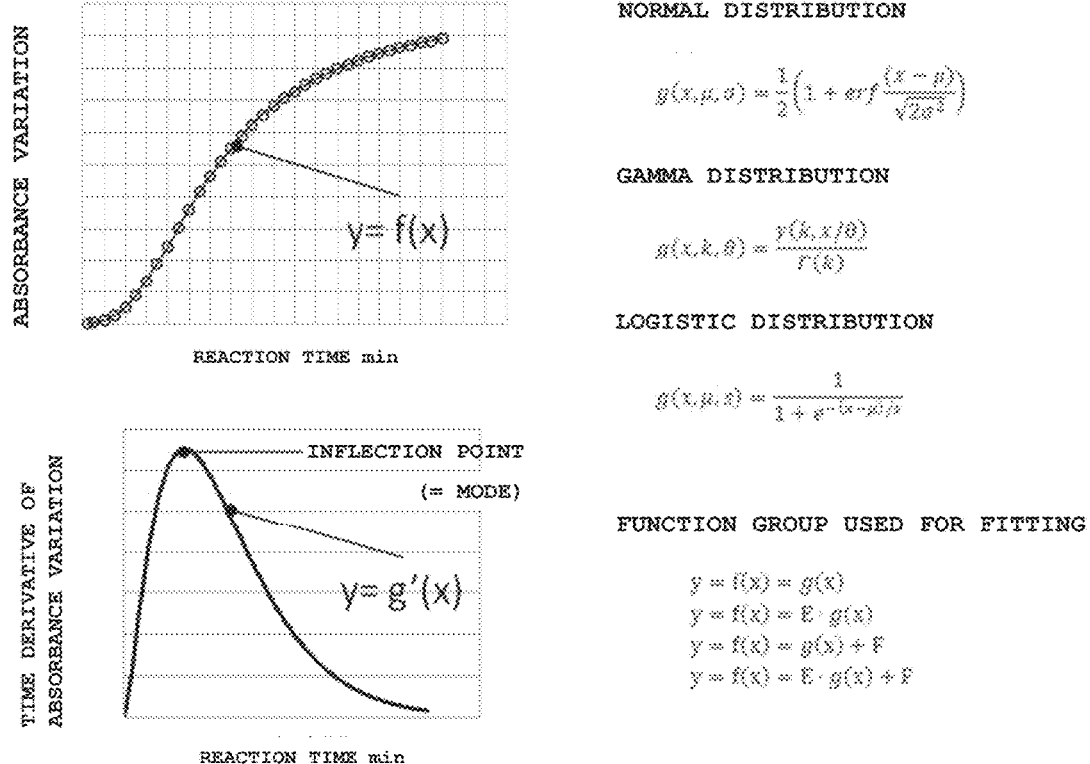
FIG. 14 shows an explanatory view in example 8 of the present invention.

First, FIG. 13 illustrates an explanatory view concerning a method for calculating an inflection point using a cumulative distribution function of gamma distribution. The cumulative distribution function and the probability density function have a relation of differential and integral calculus. The inflection point (maximum of differential value) of the cumulative distribution function is the mode of the probability density function. The mode of the probability density function can be mathematically calculated, and by fitting the reaction course with the cumulative distribution function, it is possible to easily acquire the inflection point regardless of the variation in measurement. In actual, there is no influence on the inflection point even when a constant of proportionality and a constant term are added to the cumulative distribution function, and thus the group of fitting functions shown in FIG. 14 can be used as the fitting function.

Figure 15:
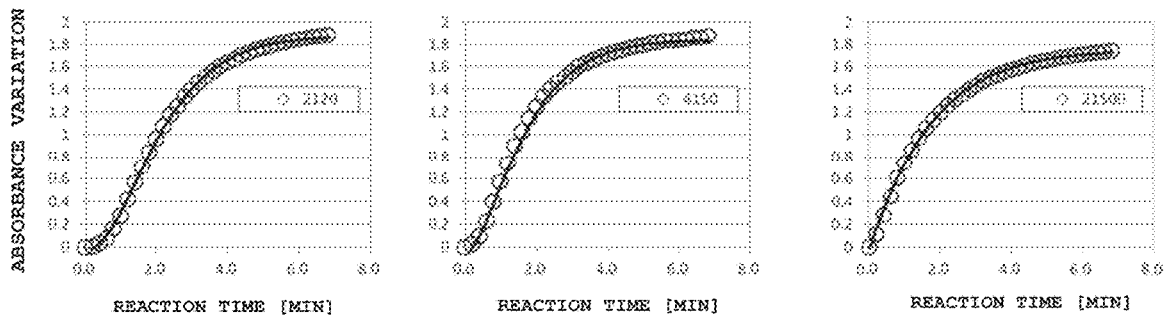
FIG. 15 shows a fitting result by gamma distribution in example 8 of the present invention.
Figure 16:
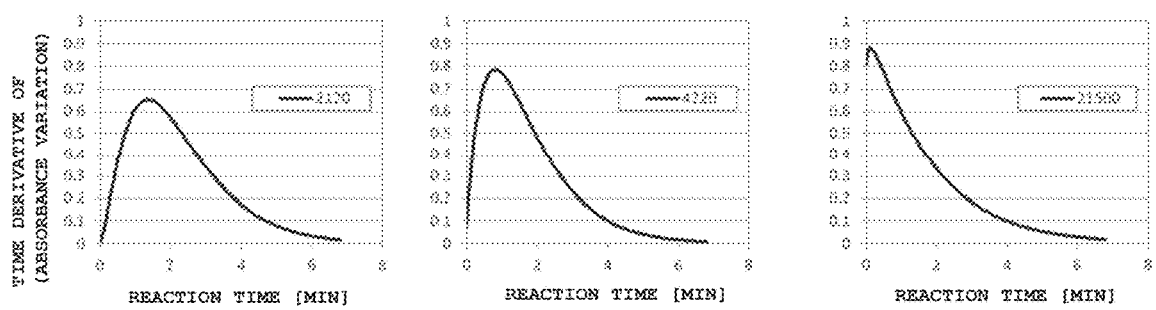
FIG. 16 shows a calculation result of an inflection point in example 8 of the present invention.
Figure 17:
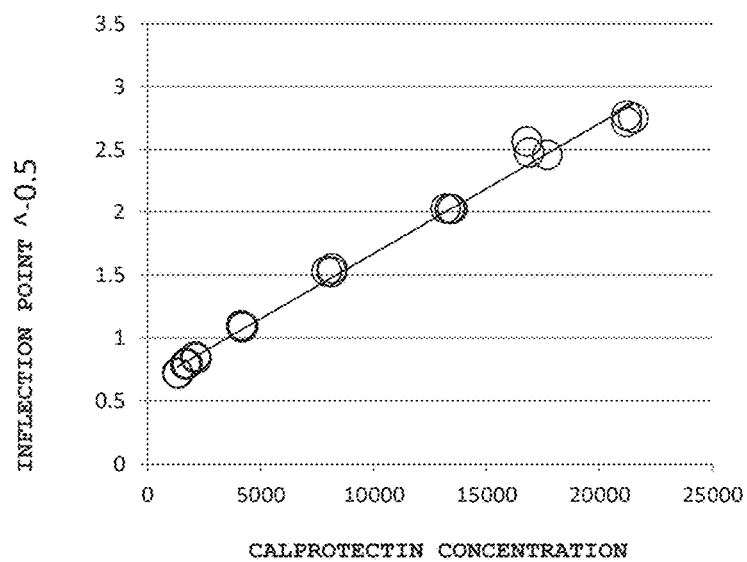
FIG. 17 shows a result of correlativity of an inflection point of high concentration calprotectin in example 8 of the present invention.

FIGS. 15 to 17 show the results concerning outputting means and step of the component to be analyzed at high concentration in measurement of high concentration calprotectin samples. The absorbance variation by a reaction course was fitted with a function given by adding a constant of proportionality and a constant term to the cumulative distribution function of gamma (γ) distribution. In the above function, fitting could be successfully made at any concentration (FIG. 15). Focusing on the inflection point (maximum point of time derivative) as a parameter, the time derivative of (absorbance variation) was plotted with respect to the reaction time. The time derivative value showed a bell shape, and the peak position shifted to the short time side as the concentration increased (FIG. 16).

Also, the relation between the sample concentration and the inflection point was examined. As shown in FIG. 17, they showed a linear relation when (inflection point)^−0.5 was plotted on the vertical axis with respect to the concentration. It was also found that by using this correlation, the line can be used as a high concentration calibration curve that outputs the concentration even in a region of about 20 times the concentration upper limit (1200 U/mL) of outputting concentration based on the absorbance variation after end of the reaction. As a result, it is possible to output the concentration of the component to be analyzed without conducting dilution reexamination. Also, the time derivative corresponds to the probability density function, and the peak position is the mode of the probability density function in this process. It was found that a calibration curve in a high concentration region can be calculated more easily by using the analysis device, the analysis method and the like of the present invention.

What is claimed is:

1. An analysis device for a test liquid containing an agglutination-based immunological reagent and a component to be analyzed, the device comprising:
   a calculator (A) configured to calculate an initial reaction velocity V1 in a reaction course of the component and an initial reaction velocity V1 std in a reaction course of a calibration sample, and detect a prozone of the component by comparing a ratio of the calculated initial reaction velocities V1 and V1 std (V1/V1 std) and a threshold ratio of V1/V1 std predetermined in advance during measurement of the component, the measurement including a calibration process:
      wherein the prozone is a region in which V1/V1 std exceeds the predetermined threshold and a measurable region is a region in which V1/V1 std is at or below the predetermined threshold; and
      wherein in the calibration process, by starting reaction between the calibration sample having a definite concentration, and an immunological reagent, measuring until the reaction ends, to prepare a calibration curve of an absorbance variation, and calculating the initial reaction velocity V1std, the analysis device is configured to obtain a threshold with higher accuracy as a threshold in prozone determination, in comparison with an upper limit initial reaction velocity in the calibration sample, the calibration process being configured to set a common threshold as the threshold to compensate for an error between different lots;
   a calculator (B) configured to calculate a reaction velocity ratio R in the reaction course of the component as a ratio of a reaction velocity during the reaction course of the component to the initial reaction velocity V1 and a standard reaction velocity ratio (R std) as a ratio of a reaction velocity during the reaction course of the calibration sample to the initial reaction velocity V1 std, and determine a high concentration region, including a first region and a second region, the first region requiring a first dilution rate of the test liquid wherein the ratio of R/R std exceeds a predetermined threshold of R/R std and the second region requiring a second dilution rate of the test liquid wherein the ratio of R/R std is below the predetermined threshold of R/R std, such that the first or second dilution rate is determined without dilution of the sample during said measurement of the component; and
   a diluter configured to dilute the test liquid at the first or second dilution rate as determined by the calculator (B);
   wherein the pre-determined thresholds are calculated based on calibration samples whose concentrations of analyte are known.

2. The analysis device according to claim 1, wherein the calculator (A) is configured to use an absorbance measurement result in the reaction course of the component to detect the prozone.

3. The analysis device according to claim 2, wherein the calculator (A) is configured to refer to an absorbance measurement result in the reaction course of the calibration sample to detect the prozone.

4. The analysis device according to claim 1, wherein the calculator (B) is configured to determine the first dilution rate or the second dilution rate of the test liquid by using an absorbance measurement result in the reaction course of the component to be analyzed.

5. The analysis device according to claim 4, wherein the calculator (B) is configured to determine the first dilution rate or the second dilution rate of the test liquid by referring to an absorbance measurement result in the reaction course of the calibration sample.

6. The analysis device according to claim 1, wherein the component to be analyzed includes a tissue-derived component.

7. The analysis device of claim 1, wherein the first dilution rate or the second dilution rate is a dilution rate making the test liquid fall within the measurable region.

8. The analysis device of claim 1, wherein the first dilution rate or the second dilution rate is about 10-fold for the component of about 2000 U/mL when the analysis device has the measurable region of 50 to 1000 U/mL.

9. The analysis device of claim 1, wherein the first dilution rate or the second dilution rate is about 100-fold for the component of about 20000 U/mL when the analysis device has the measurable region of 50 to 1000 U/mL.

* * * * *